US009524636B2

(12) United States Patent
Wang

(10) Patent No.: US 9,524,636 B2
(45) Date of Patent: Dec. 20, 2016

(54) UNIVERSAL REMOTE CONTROLLER FOR REPLACING EXCLUSIVE REMOTE CONTROLLERS OF ELECTRONIC DEVICES

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 0 days.

(21) Appl. No.: 14/702,780

(22) Filed: May 4, 2015

(65) Prior Publication Data

US 2015/0371531 A1 Dec. 24, 2015

(30) Foreign Application Priority Data

Jun. 24, 2014 (TW) ............................ 103121760 A

(51) Int. Cl.

*G05B 11/01* (2006.01)
*G08C 17/02* (2006.01)
*G08C 23/04* (2006.01)

(52) U.S. Cl.

CPC ............... *G08C 17/02* (2013.01); *G08C 23/04* (2013.01); *G08C 2201/30* (2013.01); *G08C 2201/50* (2013.01); *G08C 2201/92* (2013.01); *G08C 2201/94* (2013.01)

(58) Field of Classification Search

CPC ...................................................... G08C 17/02
USPC ....................................................... 340/12.54
See application file for complete search history.

(56) References Cited

U.S. PATENT DOCUMENTS

| | | | | | |
|---|---|---|---|---|---|
| 7,877,766 | B1 * | 1/2011 | Wu | G11B 27/105 725/22 |
| 2002/0020749 | A1 | 2/2002 | Kato | |
| 2002/0066785 | A1 * | 6/2002 | Liston | G06K 7/0021 235/441 |
| 2003/0048295 | A1 * | 3/2003 | Lilleness | G06F 3/14 715/738 |
| 2004/0257259 | A1 | 12/2004 | Jindal | |
| 2005/0055716 | A1 * | 3/2005 | Louie | G06F 1/1632 725/58 |
| 2007/0052547 | A1 * | 3/2007 | Haughawout | G08C 19/28 340/4.31 |
| 2009/0094645 | A1 * | 4/2009 | Ting | G08C 17/00 725/39 |

(Continued)

FOREIGN PATENT DOCUMENTS

| | | | |
|---|---|---|---|
| DE | 36 37 684 | A1 | 5/1987 |
| JP | H0451697 | A | 2/1992 |

(Continued)

*Primary Examiner* — Santiago Garcia
(74) *Attorney, Agent, or Firm* — Winston Hsu; Scott Margo

(57) ABSTRACT

A universal remote controller includes a card and a housing. The card includes an information tag. The housing includes a touch panel, a slot, a reader, a memory, a processor, and a signal transmitter. The memory is used for storing a plurality of databases. When the card is inserted to the slot, the reader in the housing induces the driving signal corresponding to the information tag of the card. The processor enables a corresponding database from the memory according to the driving signal and further provides a plurality of remote control functions on the transparent touch panel corresponding to positions of a plurality of key images according to the enabled database.

15 Claims, 18 Drawing Sheets

(56) References Cited

U.S. PATENT DOCUMENTS

| | | | | |
|---|---|---|---|---|
| 2011/0102158 | A1* | 5/2011 | Haughawout | G08C 19/28<br>340/12.29 |
| 2011/0181386 | A1* | 7/2011 | Lee | G08C 17/00<br>340/4.3 |
| 2012/0210268 | A1* | 8/2012 | Hilbrink | G06F 3/0484<br>715/773 |
| 2012/0303520 | A1* | 11/2012 | Huang | H01M 10/46<br>705/39 |
| 2015/0194048 | A1* | 7/2015 | Haubrich | G08C 17/02<br>340/12.5 |
| 2015/0243163 | A1* | 8/2015 | Shoemake | G08C 23/02<br>367/197 |
| 2015/0319503 | A1* | 11/2015 | Mishra | H04N 21/4828<br>725/53 |

FOREIGN PATENT DOCUMENTS

| | | | |
|---|---|---|---|
| JP | H10183723 | A | 7/1998 |
| JP | 2003330600 | A | 11/2003 |
| JP | 2004128757 | A | 4/2004 |
| JP | 200565118 | A | 3/2005 |
| JP | 2007116484 | A | 5/2007 |
| TW | 200727607 | | 7/2007 |
| TW | M324350 | | 12/2007 |
| TW | M335882 | | 7/2008 |
| TW | 201113744 | | 4/2011 |
| TW | 201142722 | | 12/2011 |

* cited by examiner

UNIVERSAL REMOTE CONTROLLER FOR REPLACING EXCLUSIVE REMOTE CONTROLLERS OF ELECTRONIC DEVICES

BACKGROUND OF THE INVENTION

1. Field of the Invention

The present invention discloses a universal remote controller, and more particularly, a universal remote controller driven by using a card.

2. Description of the Prior Art

As technology develops over time, a lot of electronic devices are produced to have a wireless control function. A user may use an exclusive remote controller to control an electronic device from a distance to execute functions. For example, the user may use an exclusive remote controller of a television to control the channel to be displayed, an exclusive remote controller of an audio system to control the volume, an exclusive remote controller of an air conditioning system to control the temperature, etc. The above mentioned remote controllers use wireless transmitters to wirelessly transmit control signals. Examples of the control signals include infrared signal, wireless fidelity (Wi-Fi) signal, Bluetooth signal, radio frequency signal, etc.

In general, each of the above mentioned electronic devices has a corresponding exclusive remote controller to perform remote control functions and is exclusively produced by the manufacturer for a corresponding electronic device. However, after being used for a period of time, such exclusive remote controllers may break and unable to be used. In this case, the user may choose to buy exclusive remote controllers to control operation of the electronic devices or buy a universal remote control to replace all of the exclusive remote controllers. Although buying an exclusive remote controller for an electronic device can solve the problem of replacing the broken exclusive remote controller of the electronic device, the exclusive remote controller may be too expensive or has already stopped production. Thus, there would be difficulty in executing such solution. Another way to solve the problem is by using a universal remote controller. A wireless remote control replication function of a universal remote controller may be used to replicate the wireless remote control signals corresponding to keys of an exclusive remote controller through a wireless receiver (i.e. infrared (IR) receiver). The user may use the database stored in the universal remote controller to gradually set a key or a group of keys of the universal remote controller to correspond to the wireless remote control code of the exclusive remote controller. However, when using the universal remote controller, because of the complexity of the operation and the lack of indicators on the universal remote controller on how to gradually set a key or a group of keys of the universal remote controller to correspond to the wireless remote control code of the exclusive remote controller, the user must manually set each of the key functions of the universal remote controller while referring to instructions in the user's manual. When the user's manual gets lost, the user may not be able to set or properly use the universal remote controller. Therefore, it is important that the universal remote controller is easy and convenient to use.

SUMMARY OF THE INVENTION

An embodiment of the present invention discloses a universal remote controller. The remote controller comprises a housing, a touch panel, a memory, a processor, and a transmitter. The touch panel is arranged on a side of the housing and configured to receive a plurality of touch signals. The memory is disposed inside the housing and configured to store a plurality of databases. The processor is coupled to the touch panel and the memory and configured to enable a corresponding database stored in the memory according to a driving signal to provide a plurality of remote control functions corresponding to a plurality of key images. And, the transmitter is coupled to the processor and configured to transmit remote control signals corresponding to the plurality of remote control functions selected on the touch panel.

Another embodiment of the present invention discloses a universal remote controller. The remote controller comprises a housing, two touch panels, a memory, a processor, and a transmitter. The two touch panels have one touch panel arranged on one side of the housing and another touch panel arranged on another side of the housing and configured to receive a plurality of touch signals. The memory is disposed inside the housing and configured to store a plurality of databases. The processor is coupled to the two touch panels and the memory and configured to enable a corresponding database stored in the memory according to a driving signal to provide a plurality of remote control functions corresponding to a plurality of key images. And, the transmitter is coupled to the processor and configured to transmit remote control signals corresponding to the plurality of remote control functions selected on the touch panel.

An additional embodiment of the present invention discloses a universal remote controller. The universal remote controller comprises a portable electronic device and a universal remote controller. The portable electronic device comprises a display touch panel, a memory configured to store a plurality of databases, a processor coupled to the display touch panel and the memory and configured to enable a corresponding database stored in the memory according to a driving signal to provide a plurality of remote control functions corresponding to a plurality of key images, and a signal transmitter module coupled to the processor and configured to transmit a first set of remote control signals corresponding to the plurality of key images selected on the display touch panel. The universal remote controller comprises a housing, a signal receiver module configured to receive the remote control signals transmitted by the signal transmitter module of the portable electronic device, a processor configured to transform the first set of remote control signals transmitted by the signal transmitter module of the portable electronic device to a second set of remote control signals, and a signal transmitter module coupled to the processor of the universal remote controller and configured to transmit the second set of remote control signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
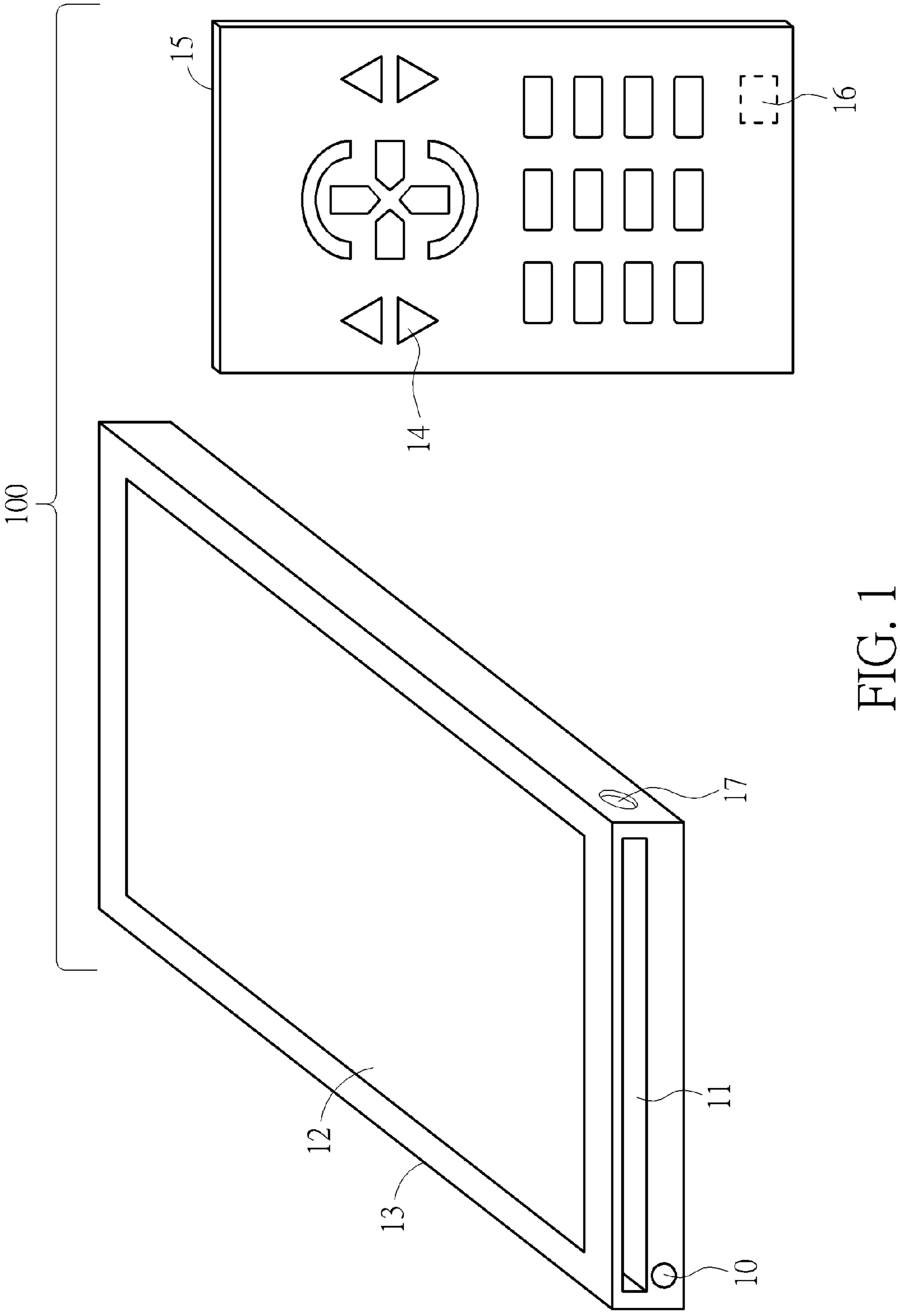
FIG. 1 illustrates a diagram of external components of a universal remote controller according to a first embodiment of the present invention.
Figure 2:
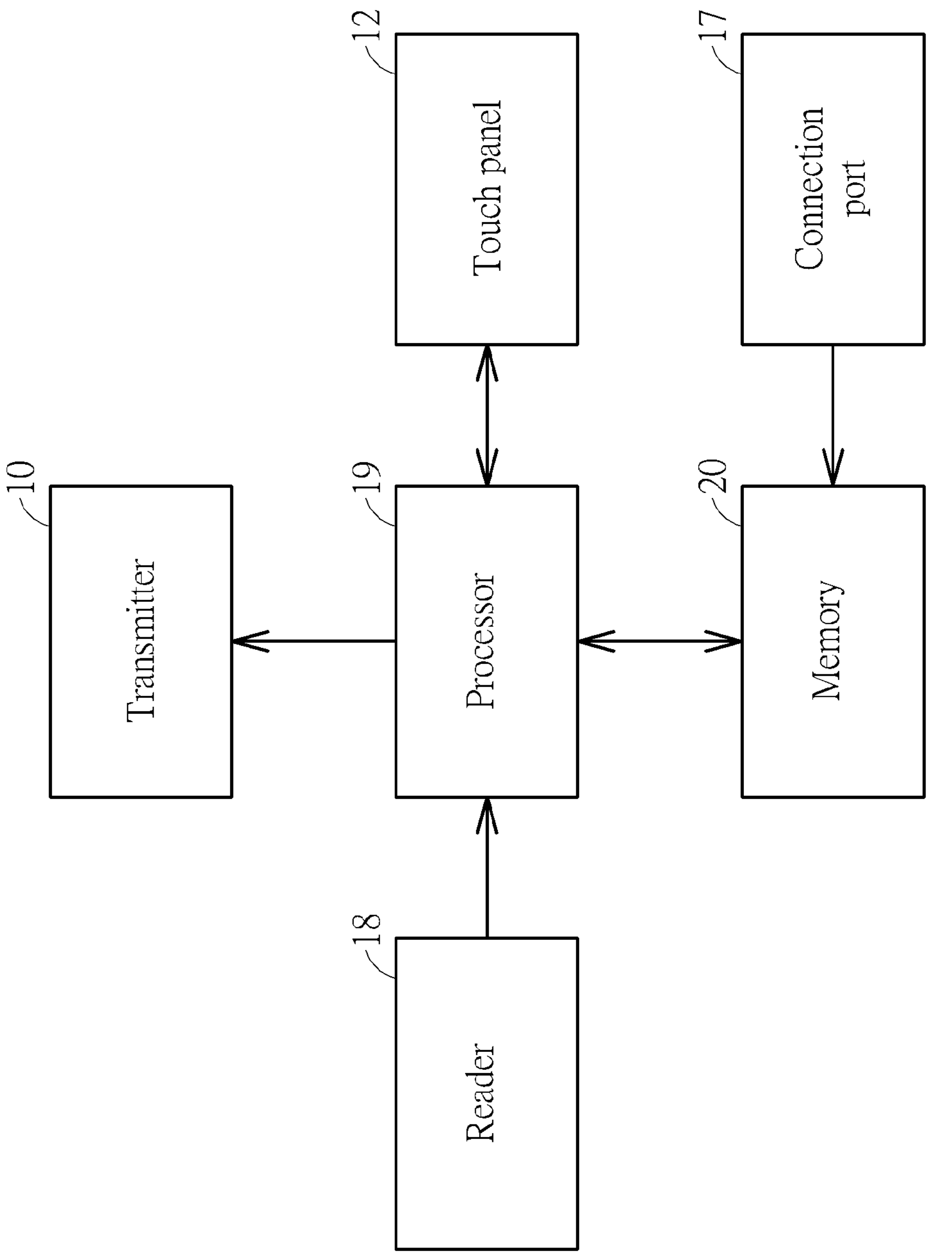
FIG. 2 illustrates a diagram of internal components of the universal remote controller according to the first embodiment of the present invention.

FIG. 1 illustrates a diagram of external components of a universal remote controller 100 according to a first embodiment of the present invention. FIG. 2 illustrates a diagram of internal components of the universal remote controller 100 according to the first embodiment of the present invention. In the embodiment, the universal remote controller 100 comprises a card 15 and a housing 13. The card 15 may be a magnetic graphic card comprising of a plurality of key images 14 and an information tag 16. The information tag may be a sensor chip. The card 15 may correspond to an exclusive remote controller and each of the plurality of key images 14 on the card 15 may correspond to each of the keys of the exclusive remote controller. For example, an exclusive remote controller A may have 30 keys. If the card 15 corresponds to the exclusive remote controller A, the card 15 may have 30 key images. The information tag 16 of the card 15 may be used to generate a driving signal corresponding to the exclusive remote controller A to drive the universal remote controller 100. The driving process of the universal remote controller 100 is described in the following section. In the embodiment, the information tag 16 may be a contacting sensor chip or a non-contacting sensor chip. As shown in FIG. 1 and FIG. 2, the housing 13 may comprise of a touch panel 12, a slot 11, a reader 18, a memory 20, a processor 19, a transmitter 10, and a connection port 17. The touch panel 12 may be a transparent touch panel arranged on a side of the housing 13 and configured to receive a plurality of touch signals from a user. The slot 11 may be arranged inside the housing 13 for receiving the card 15. The reader 18 may be a sensing device configured to read information from the information tag 16 when the card 15 is inserted into the slot 11 and output the driving signal correspondingly. The memory 20 may be disposed inside the housing 13 and configured to store a plurality of databases. Each of the plurality of databases may store positions and remote control functions corresponding to an exclusive remote controller. For example, a database A may store positions and remote control functions of the 30 keys of the exclusive remote controller A. The plurality of databases stored in the memory 20 of the universal remote controller 100 may be used to store equivalent positions and remote control functions of a plurality of exclusive remote controllers. The processor 19 may be configured to process the driving signal corresponding to the information tag 16 of the card 15 and execute a corresponding driving process of an exclusive remote controller. The driving process of the exclusive remote controller is described in the following section. The transmitter 10 may be a wireless transmitter module configured to transmit remote control signals corresponding to the plurality of remote control functions when touch panel 12 receives a plurality of touch signals. The connection port 12 may be configured to receive external information to update the plurality of databases of the memory 20 according to the external information going through the connection port 12. In the embodiment, the connection port 17 may be a wired connection port (i.e. Universal Serial Bus (USB)) or a wireless connection port (i.e. Ultra Wideband Wireless Port (UWB), Wireless Fidelity (Wi-Fi), and Bluetooth (BT)). As shown in FIG. 2, the processor 19 may be coupled to the reader 18, the memory 20, the transmitter 10, and the touch panel 12. The connection port 17 may be coupled to the memory 20. The following sections describe examples of operations of the universal remote controller 100.

An exclusive remote controller A may have 30 keys. Each of the 30 keys corresponds to different remote control functions and may be placed in different positions of the exclusive remote controller A. For the user to set up the universal remote controller 100 to have all the remote control functions of the exclusive remote controller A, first, the user may insert the card 15 corresponding to the exclusive remote controller A to the slot 11 of the universal remote controller 100. In this time, the information tag 16 of the card 15 may be used by the reader 18 to generate a driving signal corresponding to the exclusive remote controller A. When the reader 18 inside the housing 13 outputs the driving signal, the driving signal may be sent to the processor 19. Afterwards, the processor 19 may determine if the driving signal is legitimate (i.e. the driving signal corresponds to an exclusive remote controller). If the driving signal is not legitimate (i.e. the information tag 16 of the card 15 is damaged or the inserted card is not compatible), the processor 19 may not proceed to the next operation. If the driving signal is legitimate, the processor 19 may proceed with the operation by searching a corresponding database of the exclusive remote controller A from the plurality of databases of the memory 20. The corresponding database of the exclusive remote controller A comprises the positions and the remote control functions of the 30 keys of the exclusive remote controller A. At this time, the processor 19 may determine corresponding positions of the 30 keys of the exclusive remote controller A on the touch panel 12 according to the information on the database and link each remote control function to each of the positions of the 30 keys. When the user is using the universal remote controller 100, the key images (i.e. images of the 30 keys of the exclusive remote controller A) on the card 15 may be viewed through the touch panel 12. And because the processor 19 has linked remote control functions to the positions of 30 keys on the touch panel 12, when a touch signal is inputted to the touch panel 12 by the user (the touch signal corresponds to a position of a key image selected by the user on the touch panel 12), the touch signal from the touch panel 12 may then be returned to the processor 19 and the processor 19 may execute a corresponding remote control function of the touch signal. And the transmitter 10 may transmit a remote control signal corresponding to the remote control function executed.

However, if the information tag 16 of the card 15 is used to generate a legitimate driving signal of the exclusive remote controller A but the plurality of databases of the memory 29 does not have a corresponding database for the exclusive remote controller A (i.e. the exclusive remote controller A may be an old model or the newest model of remote controller), the universal remote controller 100 may try to capture the database of the exclusive remote controller A from the information tag 16 of the card 15 or notify the user to use the connection port 17 to connect to another device to receive an external information to update or download the database of the universal remote controller 100 and make sure that the exclusive remote controller A is supported by the universal remote controller 100. Furthermore, if the user wants to change the exclusive remote controller corresponding to the universal remote controller 100 to a different exclusive remote controller, the user may change the card 15 to a card 15 corresponding to the different exclusive remote controller. For example, if the user wants to set the universal remote controller 100 to have all of the remote control functions of an exclusive remote controller B, the user may insert a card 15 corresponding to the exclusive remote controller B into the slot 11. To set the universal remote controller 100 to have all of the remote control functions of an exclusive remote controller C, the user may insert a card 15 corresponding to the exclusive remote controller C into the slot 11. And so on . . . .

Figure 3:
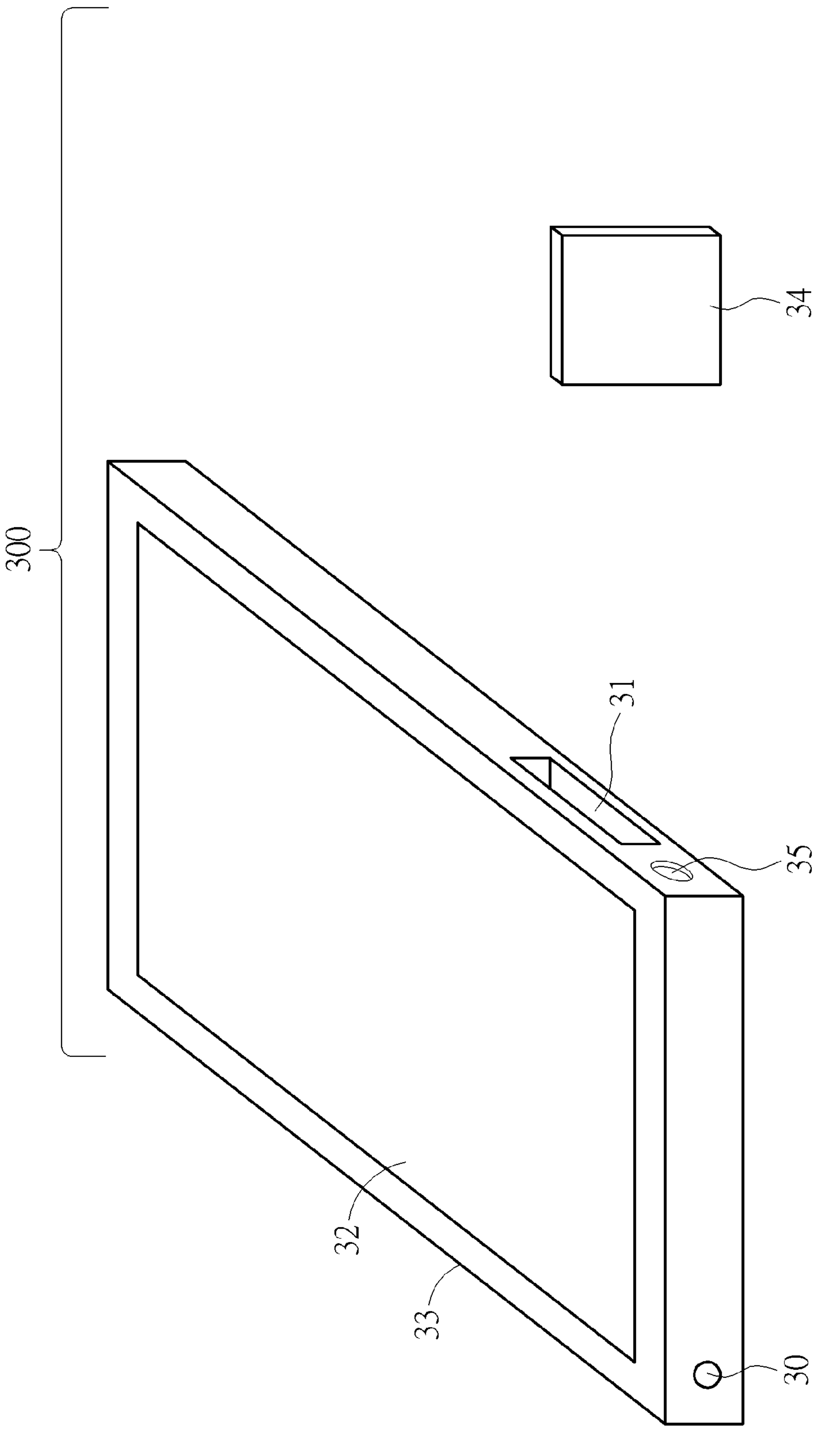
FIG. 3 illustrates a diagram of external components of a universal remote controller according to a second embodiment of the present invention.
Figure 4:
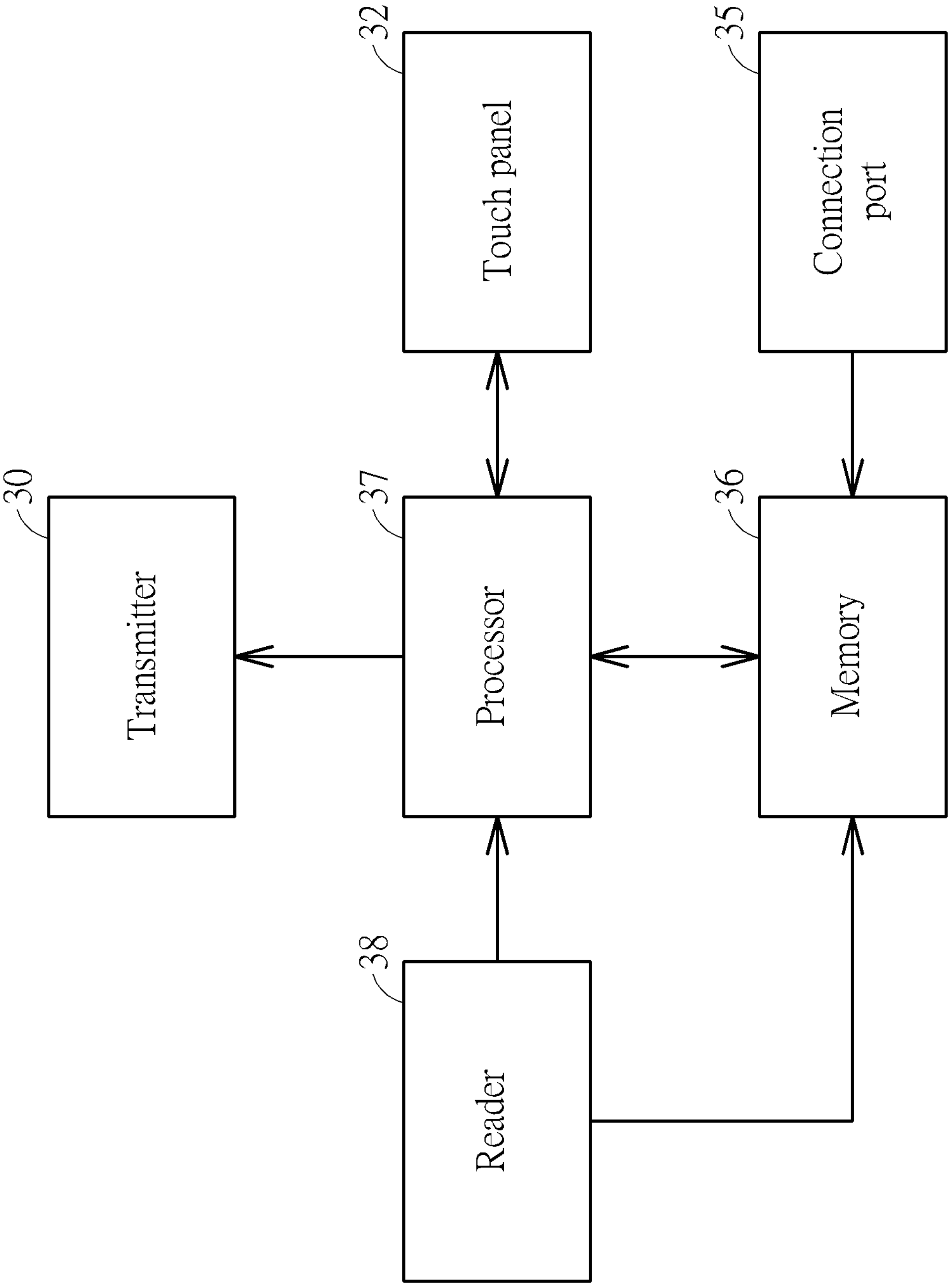
FIG. 4 illustrates a diagram of internal components of the universal remote controller according to the second embodiment of the present invention.

FIG. 3 illustrates a diagram of external components of a universal remote controller 300 according to a second embodiment of the present invention. FIG. 4 illustrates a diagram of internal components of the universal remote controller 300 according to the second embodiment of the present invention. In the embodiment, the universal remote controller 300 may comprise a card 34 and a housing 33. The card 34 may comprise an information tag. The information tag may be a Radio Frequency Identification (RFID), or a chip that is able to store information like a Secure Digital Memory Card (SD Card), Micro-Secure Digital Memory Card (Micro-SD Card), etc. The information tag of the card 34 may correspond to an exclusive remote controller. The information tag of the card 34 may be used to generate and transmit a corresponding driving signal. For example, the information tag of the card 34 may correspond to the exclusive remote controller A. When the card 34 is being used, a driving signal corresponding to the exclusive remote controller A may be transmitted to drive the universal remote controller 300. The process of driving the universal remote controller 300 may be described in the following section. In the embodiment, the information tag of the card 34 may be a contacting sensor chip or a non-contacting sensor chip. As shown in FIG. 3 and FIG. 4, the housing 33 may comprise a touch panel 32, a slot 31, a reader 38, a memory 36, a processor 37, a transmitter 30 and a connection port 35. The touch panel 32 may be a display touch panel arranged on one side of the housing 33 and may be configured to display a plurality of key images and receive a plurality of touch signals from a user. The slot 31 arranged inside the housing 33 and configured to receive the card 34. The reader 38 may be a sensor configured to transmit a driving signal corresponding to the card 34 when the card 34 is inserted in the slot 31. The memory 36 may be configured to store a plurality of databases. Different to the first embodiment, each of the plurality of databases in the memory 36 of the embodiment may not only store the positions and remote control functions corresponding to the keys of an exclusive remote controller, but also store a plurality of key images corresponding to the keys of an exclusive remote controller. For example, the database A may store the positions of the 30 keys of the exclusive remote controller A. The plurality of databases stored in the memory 36 of the universal remote controller 300 may correspondingly store positions of keys of the plurality of exclusive remote controllers and remote control functions and key images corresponding to positions of keys. The processor 37 may be configured to process the driving signal corresponding to the card 34 and execute a corresponding driving process of an exclusive remote controller. The driving process of the universal remote controller is described in the following section. The transmitter 30 may be a wireless signal transmitter configured to transmit remote control signals corresponding to the plurality of remote control functions when touch panel 32 receives a plurality of touch signals. The connection port 35 may be used to update the plurality of databases of the memory 36 according to external information going through the connection port 35. The same as first embodiment, the connection port 35 may be a wired connection port or a wireless connection port. As shown in FIG. 4, the processor 37 may be coupled to the reader 38, the memory 36, the transmitter 30 and the touch panel 32. And, the connection port 35 may be coupled to the memory 36. The following sections are examples of operations of the universal remote controller 300.

An exclusive remote controller A may have 30 keys. Each of the 30 keys corresponds to different remote control functions and is placed in different positions of the exclusive remote controller A. For the user to set up the universal remote controller 300 to have all the remote control functions of the exclusive remote controller A, first, the user must insert the card 34 corresponding to the exclusive remote controller A to the slot 31 of the universal remote controller 300. In this time, the information tag of the card 34 may be used to generate a driving signal corresponding to the exclusive remote controller A. When the reader 38 inside the housing 33 outputs the driving signal, the driving signal may be sent to the processor 37. The processor 37 may determine if the driving signal is legitimate (i.e. the driving signal corresponds to an exclusive remote controller). If the driving signal is not legitimate (i.e. the card 34 is damaged or the inserted card is not compatible), the processor 37 may not proceed to the next operation. If the driving signal is legitimate, the processor 37 may proceed with the operation by searching a corresponding database of the exclusive remote controller A from the plurality of databases of the memory 36. The corresponding database of the exclusive remote controller A comprises the 30 positions of keys of the exclusive remote controller A and the remote control functions and key images corresponding to the 30 positions of keys. At this time, the processor 37 may display the 30 keys of the exclusive remote controller A on the touch panel 32 according to the information on the database. The positions and the key images corresponding to keys displayed on the touch panel 32 may be the same as the positions of the keys on the exclusive remote controller A. The processor 37 may link a remote control function to each of the positions of the 30 keys displayed on the touch panel 32. When the user is using the universal remote controller 300, the 30 key images corresponding to the exclusive remote controller A may be displayed on the touch panel 32. And because the processor 37 has linked remote control functions to key images displayed on the touch panel 32, when a touch signal is inputted to the touch panel 32 by the user (the touch signal corresponds to a position of a key image on the touch panel 32), the touch signal received from the touch panel 32 may then be returned to the processor 37 and the processor 37 may execute a corresponding remote control function according to the touch signal. And the transmitter 30 may transmit remote control signals corresponding to the remote control function executed.

However, if the card 34 transmits a legitimate driving signal of the exclusive remote controller A but the plurality of databases of the memory 36 does not have a corresponding database for the exclusive remote controller A (i.e. the exclusive remote controller A may be an old model or the newest model of remote controller), the universal remote controller 300 may try to capture the database of the exclusive remote controller A from the card 34 or use the connection port 35 to update the database as shown in the second embodiment. Furthermore, if the user wants to change the exclusive remote controller corresponding to the universal remote controller 300 to a different exclusive remote controller, the user may change the card 34 corresponding to the different exclusive remote controller.

Figure 5:
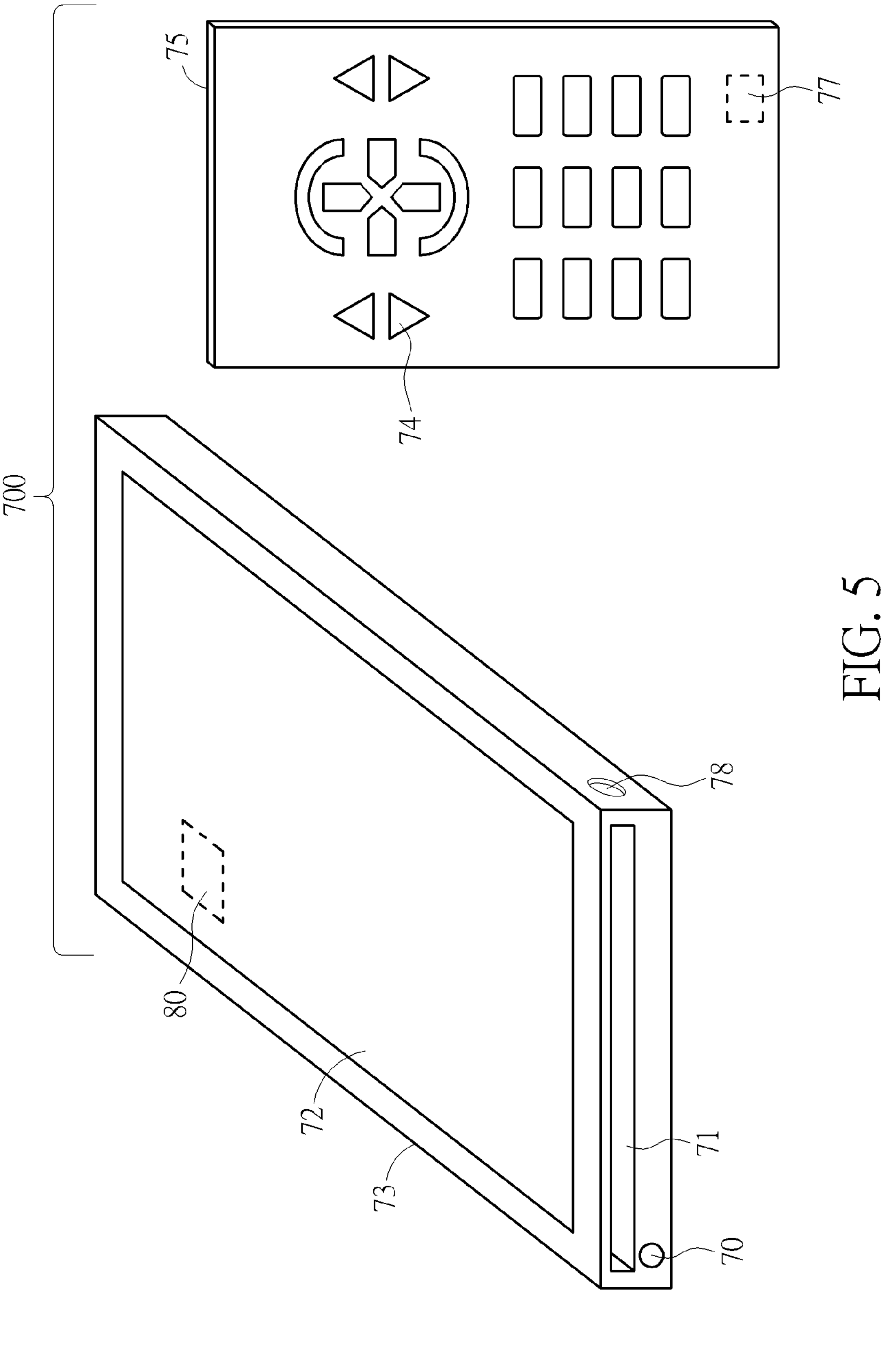
FIG. 5 illustrates a diagram of external components of a universal remote controller according to a third embodiment of the present invention.
Figure 6:
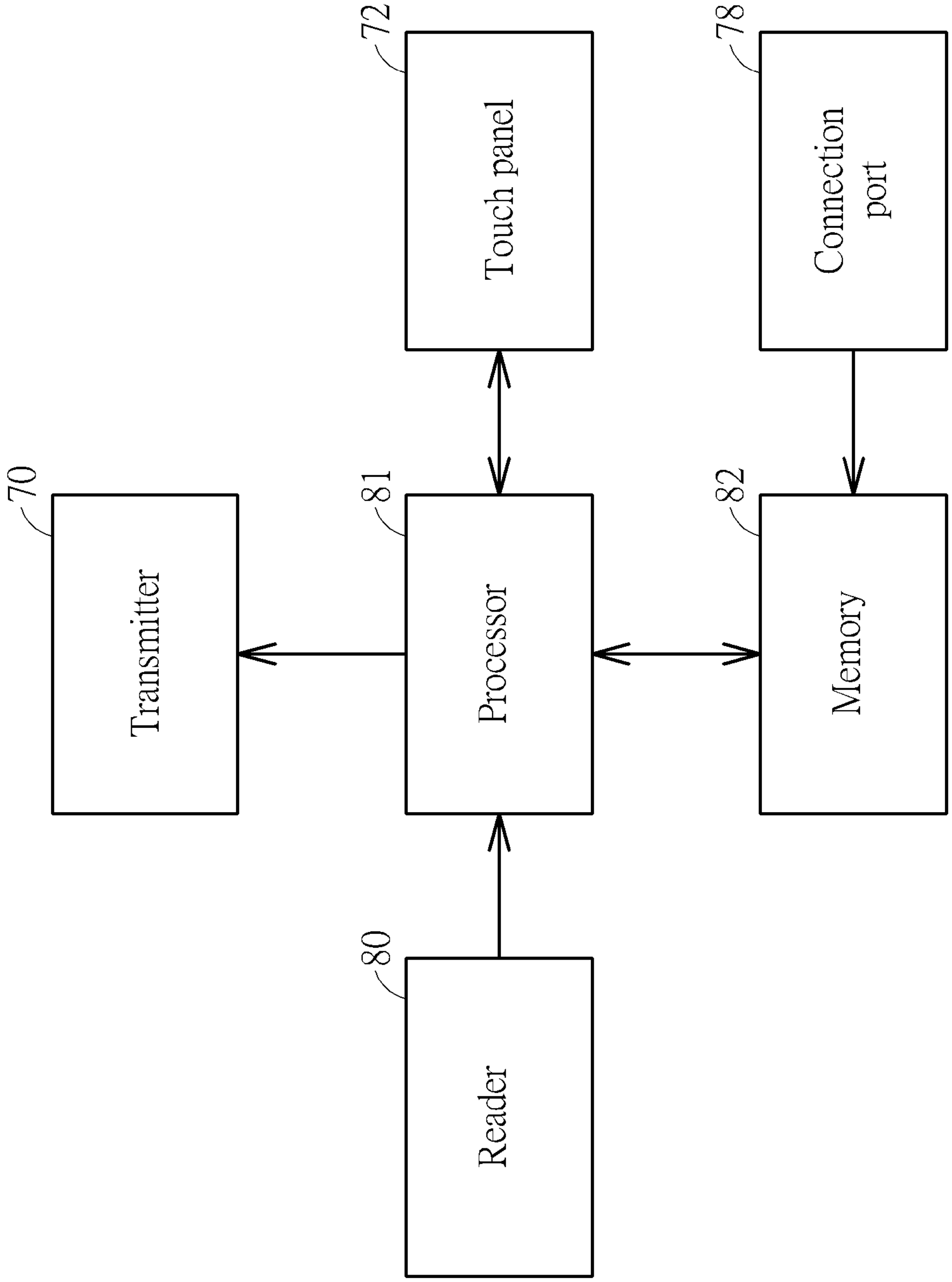
FIG. 6 illustrates a diagram of internal components of the universal remote controller according to the third embodiment of the present invention.

FIG. 5 illustrates a diagram of external components of a universal remote controller 700 according to a third embodiment of the present invention. FIG. 6 illustrates a diagram of internal components of the universal remote controller 700 according to the third embodiment of the present invention. In the third embodiment, the universal remote controller 700 may comprise a card 75 and a housing 73. The card 75 may be a magnetic graphic card comprising of a plurality of key images 74 and an information tag 77. The card 75 may correspond to an exclusive remote controller and the plurality of key images 74 on the card 75 may correspond to each of the keys of the exclusive remote controller. For example, an exclusive remote controller A may have 30 keys. If the card 75 corresponds to the exclusive remote controller A, the card 75 may have 30 key images. The information tag 77 of the card 75 may be an identification code corresponding to an exclusive remote controller, i.e. Quick Response Code (QR Code), Bar Code, etc. The information tag 77 may be used to drive the universal remote controller 700. The driving program of the universal remote controller 700 is described in the following section. As shown in FIG. 5 and FIG. 6, the housing 73 may comprise of a touch panel 72, a slot 71, a reader 80, a memory 82, a processor 81, a transmitter 70, and a connection port 78. The touch panel 72 may be a transparent touch panel arranged on a side of the housing 73 and configured to receive a plurality of touch signals from a user. The slot 71 may be arranged inside the housing for receiving the card 75. The reader 80 may be a scanning device configured to read information from the information tag 77 and output the driving signal correspondingly. The memory 20 may be disposed inside the housing and configured to store a plurality of databases. Each of the plurality of databases may store positions and remote control functions corresponding to an exclusive remote controller. For example, a database A may store positions of the 30 keys of the exclusive remote controller A and each position corresponds to a remote control function. The plurality of databases stored in the memory 82 of the universal remote controller 700 may be used to store equivalent positions and remote control functions of a plurality of exclusive remote controllers. The processor 81 may be configured to process the driving signal generated by scanning the information tag 77 using the reader 80 and execute a corresponding driving process of a remote controller. The driving process of the remote controller is described in the following section. The transmitter 70 may be a wireless transmitter module configured to transmit remote control signals corresponding to the plurality of remote control functions when touch panel 72 receives a plurality of touch signals. The connection port 78 may be used to update the plurality of databases of the memory 82 by inputting external information to the universal remote controller 700 through the connection port 78. In the embodiment, the connection port 78 may be a wired connection port (i.e. Universal Serial Bus (USB)) or a wireless connection port (i.e. Ultra Wideband Wireless Port (UWB), Wireless Fidelity (Wi-Fi), and Bluetooth (BT)). In FIG. 6, the processor 19 may be coupled to the reader 80, the memory 82, the transmitter 70, and the touch panel 72. The connection port 78 may be coupled to the memory 82. The following sections are examples of operations of the universal remote controller 700.

Here is a description of an example of an operation of the universal remote controller 700. An exclusive remote controller A may have 30 keys. Each of the 30 keys corresponds to different remote control functions and is placed in different positions on the exclusive remote controller A. When the user is setting the universal remote controller 700 to have all the remote control functions of the exclusive remote controller A, first, the user must insert the card 75 corresponding to the exclusive remote controller A to the slot 71 of the universal remote controller 700. The reader 80 of the housing 73 may scan the information tag 77 of card 75 to generate a driving signal corresponding to the exclusive remote controller A. The processor 81 may determine if the driving signal corresponding to an exclusive remote controller is legitimate. If the driving signal is not legitimate (i.e. the information tag 77 of the card 75 is damaged or the inserted card is not compatible), the processor 81 may not proceed to the next operation. If the driving signal is legitimate, the processor 81 may proceed with the operation by searching a corresponding database of the exclusive remote controller A from the plurality of databases of the memory 82. The corresponding database of the exclusive remote controller A may comprise the positions and the remote control functions of the 30 keys of the exclusive remote controller A. At this time, the processor 81 may determine the corresponding positions of the 30 keys of the exclusive remote controller A on the touch panel 72 according to the information on the database and link a remote control function to each of the positions of the 30 keys. When the user is using the universal remote controller 700, the 30 key images on the card 75 may be viewed through the touch panel 72.

And because the processor 81 has linked remote control functions to positions of the 30 keys on the touch panel 72, when a touch signal is inputted to the touch panel 72 by the user (the touch signal corresponds to a position of a key image on the touch panel 72), the touch signal received from the touch panel 72 may then be returned to the processor 81 and the processor 81 may execute a corresponding remote control function according to the touch signal. And the transmitter 70 may transmit a remote control signal corresponding to the remote control function executed.

However, if the processor 81 determines that the driving signal is a legitimate driving signal of the exclusive remote controller A but the plurality of databases of the memory 82 does not have a corresponding database for the exclusive remote controller A (i.e. the exclusive remote controller A may be an old model or the newest model of remote controller), the universal remote controller 700 may use the connection port 78 to update the database of the universal remote controller 700 as described in the first embodiment and second embodiment of the present invention. Furthermore, if the user wants to change the exclusive remote controller corresponding to the universal remote controller 700 to a different exclusive remote controller, the user may change the card 75 may be changed to a card 75 corresponding to the different exclusive remote controller.

Figure 7:
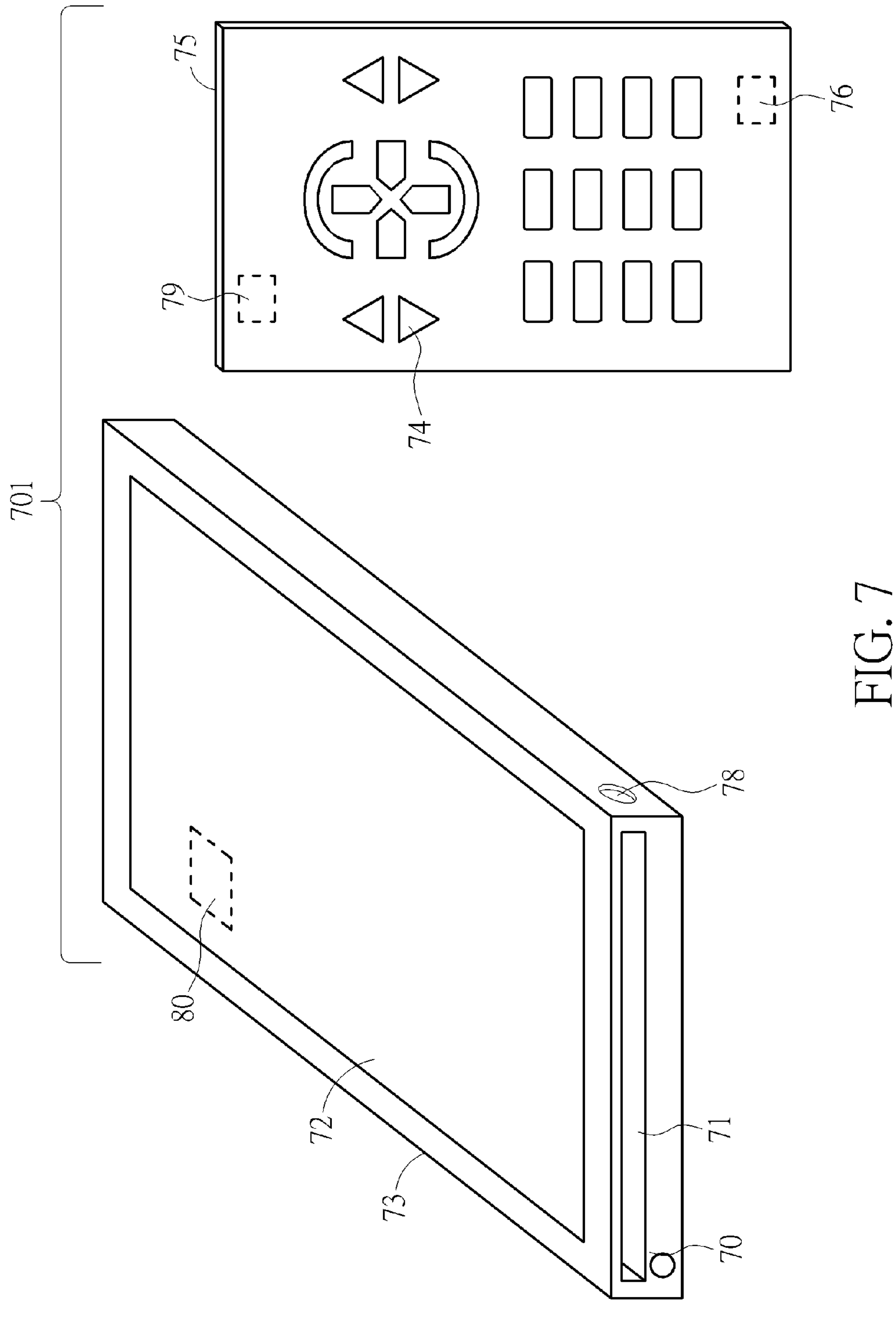
FIG. 7 illustrates a diagram of external components of a universal remote controller according to a fourth embodiment of the present invention.

FIG. 7 illustrates a diagram of external components of a universal remote controller 701 according to a fourth embodiment of the present invention. The universal remote controller 701 may have a driving process and internal components that are the same as the third embodiment. And the difference may be on the card 75 having a first information tag 76 and a second information tag 79. The first information tag 76 and the second information tag 79 may be placed diagonally across each other on the corners of the card 75 (the first information tag 76 may be placed on the lower right corner of the card 75 and the second information tag 79 may be placed on the top left corner of the card 75). The housing 73 may comprise a reader 80. The reader may be a scanning device arranged inside the housing 73 and may be positioned corresponding to the position of the first information tag 76 and the second information tag 79 of the card 75 (FIG. 7 illustrates a reader 80 arranged on top left corner of the housing 73), depending on the orientation of insertion of the card 75 in the slot 71. Therefore, the universal remote controller 701 of the fourth embodiment may allow the card 75 to be inserted into the slot 71 having the card 75 on a first orientation corresponding to the housing 73 or may be rotated 180 degrees and have the card 75 be inserted into the slot 71 having the card 75 on a second orientation corresponding to the housing 73. If the card 75 is on a first orientation corresponding to the housing 73, the reader 80 of the housing 73 may scan the first information tag 76 of the card 75 and generate a driving signal corresponding to the exclusive remote control A as described in the third embodiment. If the card 75 is on a second orientation corresponding to the housing 73, the reader 80 of the housing 73 may scan the second information tag 79 of the card 75 and generate a driving signal corresponding to the exclusive remote control A. A database of the memory 82 may be updated according to the status of the universal remote controller 701 using the connection port 78. The process of updating the database is similar to the process used in the third embodiment, therefore, would not be described for brevity. Furthermore, if the user wants to change the exclusive remote controller corresponding to the universal remote controller 701 to a different exclusive remote controller, the user may change the card 75 may be changed to a card 75 corresponding to the different exclusive remote controller.

Figure 8:
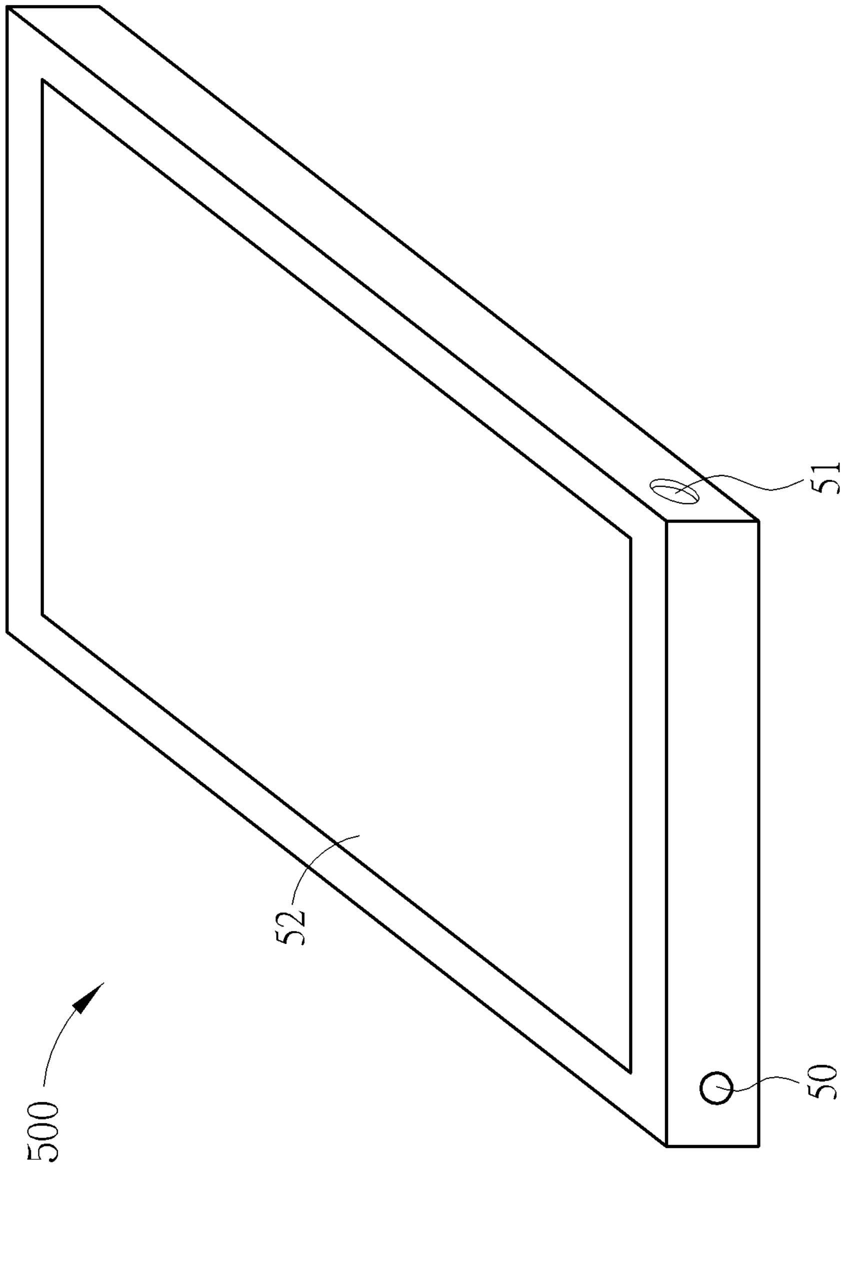
FIG. 8 illustrates a diagram of external components of a universal remote controller according to a fifth embodiment of the present invention.
Figure 9:
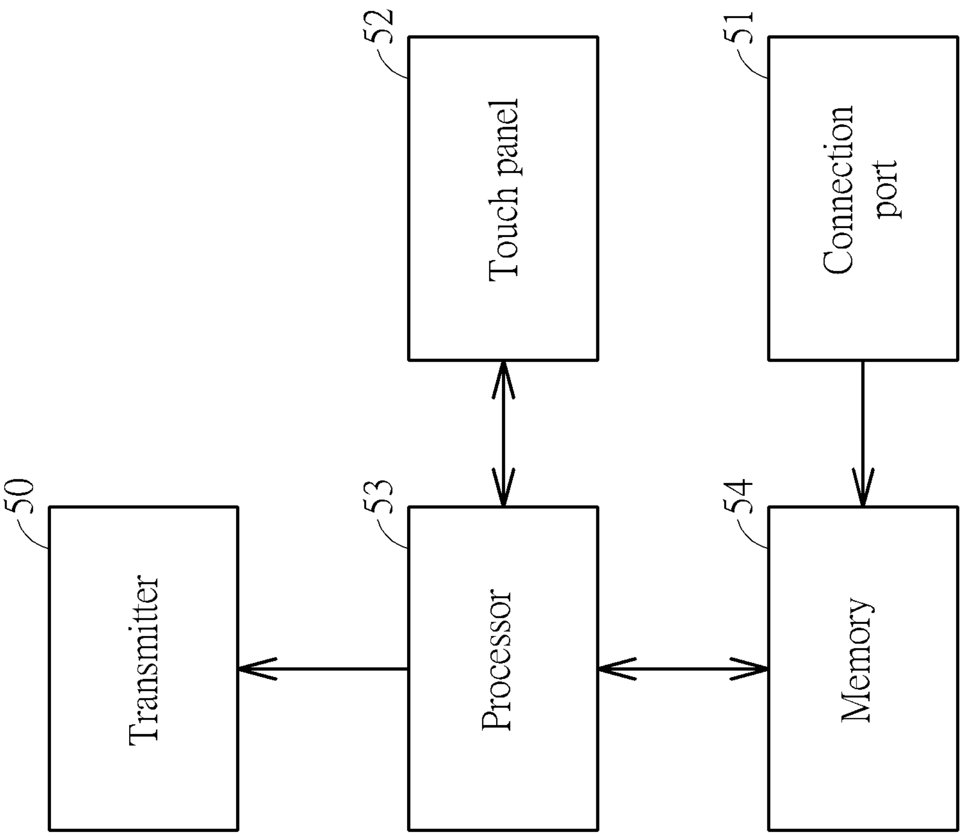
FIG. 9 illustrates a diagram of internal components of the universal remote controller according to the fifth embodiment of the present invention.

FIG. 8 illustrates a diagram of external components of a universal remote controller 500 according to a fifth embodiment of the present invention. FIG. 9 illustrates a diagram of internal components of the universal remote controller 500 according to the fifth embodiment of the present invention. In the embodiment, the universal remote controller 500 may comprise a touch panel 52, a memory 54, a processor 53, a transmitter 50 and a connection port 51. The touch panel 52 may be a display touch panel arranged on one side of the universal remote controller 500 and may be configured to receive a plurality of touch signals from a user and display a plurality of key images. The memory 54 may be configured to store a plurality of databases. Similar to the memory of the second embodiment, each of the plurality of databases in the memory 54 of the embodiment may not only store the positions corresponding to the keys of an exclusive remote controller, but also store a plurality of key images and remote control functions corresponding to the keys of the exclusive remote controller. Similar to the memory of the second embodiment, the plurality of databases stored in the memory 54 of the universal remote controller 500 may correspondingly store positions of keys of the plurality of exclusive remote controllers and store remote control functions and key images corresponding to positions of keys. The processor 53 may execute a corresponding driving process of a remote controller according to a code. The driving process of the universal remote controller 500 is described in the following section. The transmitter 50 may be a wireless signal transmitter configured to transmit remote control signals corresponding to the plurality of remote control functions when the touch panel 52 receives a plurality of touch signals. The connection port 51 may be configured to update the plurality of databases of the memory 54. Similar to the first to fourth embodiment, the connection port 54 may be a wired connection port or a wireless connection port. As shown in FIG. 9, the processor 53 may be coupled to the memory 54, the transmitter 50 and the touch panel 52. And, the connection port 51 may be coupled to the memory 54. The following sections are examples of operations of the universal remote controller 500.

An exclusive remote controller A may have 30 keys. Each of the 30 keys corresponds to different remote control functions and is placed in different positions on the exclusive remote controller A. When the user is setting up the universal remote controller 500 to have all the remote control functions of the exclusive remote controller A, first, the user may obtain a code corresponding to the exclusive remote controller A and input the code to the universal remote controller 500. The code may be supplied by the remote control manufacturer. The code may be an activation key, a serial number code, etc. After the user has entered the code, the processor 53 may determine if the code corresponding to an exclusive remote controller is legitimate. If the code is not legitimate (i.e. the code is entered incorrectly), the processor 53 may not proceed to the next operation. If the code is legitimate, the processor 53 may proceed with the operation by searching a corresponding database of the exclusive remote controller from the plurality of databases of the memory 54. Similar to the second embodiment, the corresponding database of an exclusive remote controller A may comprise the positions of 30 keys of the exclusive remote controller A and the remote control functions and key images corresponding to the positions of 30 keys. The processor 53 may display the key images of 30 keys of the exclusive remote controller A on the touch panel 52 according to the information on the database. The positions and the key images on the touch panel 52 may be the same as the exclusive remote controller A. The processor 53 may link a remote control function to each of the positions of the 30 key images displayed on the touch panel 52. When the user is using the universal remote controller 500, the 30 key images of the exclusive remote controller A may be displayed on the touch panel 52. And because the processor 53 has linked remote control functions to 30 key images displayed on the touch panel 52, when a touch signal is inputted to the touch panel 52 by the user (the touch signal may corresponds to a position of a key image on the touch panel 52), the touch signal received from the touch panel 52 may then be returned to the processor 53 and the processor 53 may execute a corresponding remote control function of the touch signal. And the transmitter 50 may transmit remote control signal corresponding to the remote control function executed.

However, if the user enters a legitimate code of the exclusive remote controller A but the plurality of databases of the memory 36 does not have a corresponding database for the exclusive remote controller A (i.e. the exclusive remote controller A may be an old model or the newest model of remote controller), the universal remote controller 500 may notify the user to use the connection port 51 to download the database of the exclusive remote controller A. Furthermore, if the user wants to change the exclusive remote controller corresponding to the universal remote controller 500 to a different exclusive remote controller, the user may obtain the code corresponding to the different exclusive remote controller and enter the code corresponding to the different exclusive remote controller to the universal remote controller 500.

Figure 10:
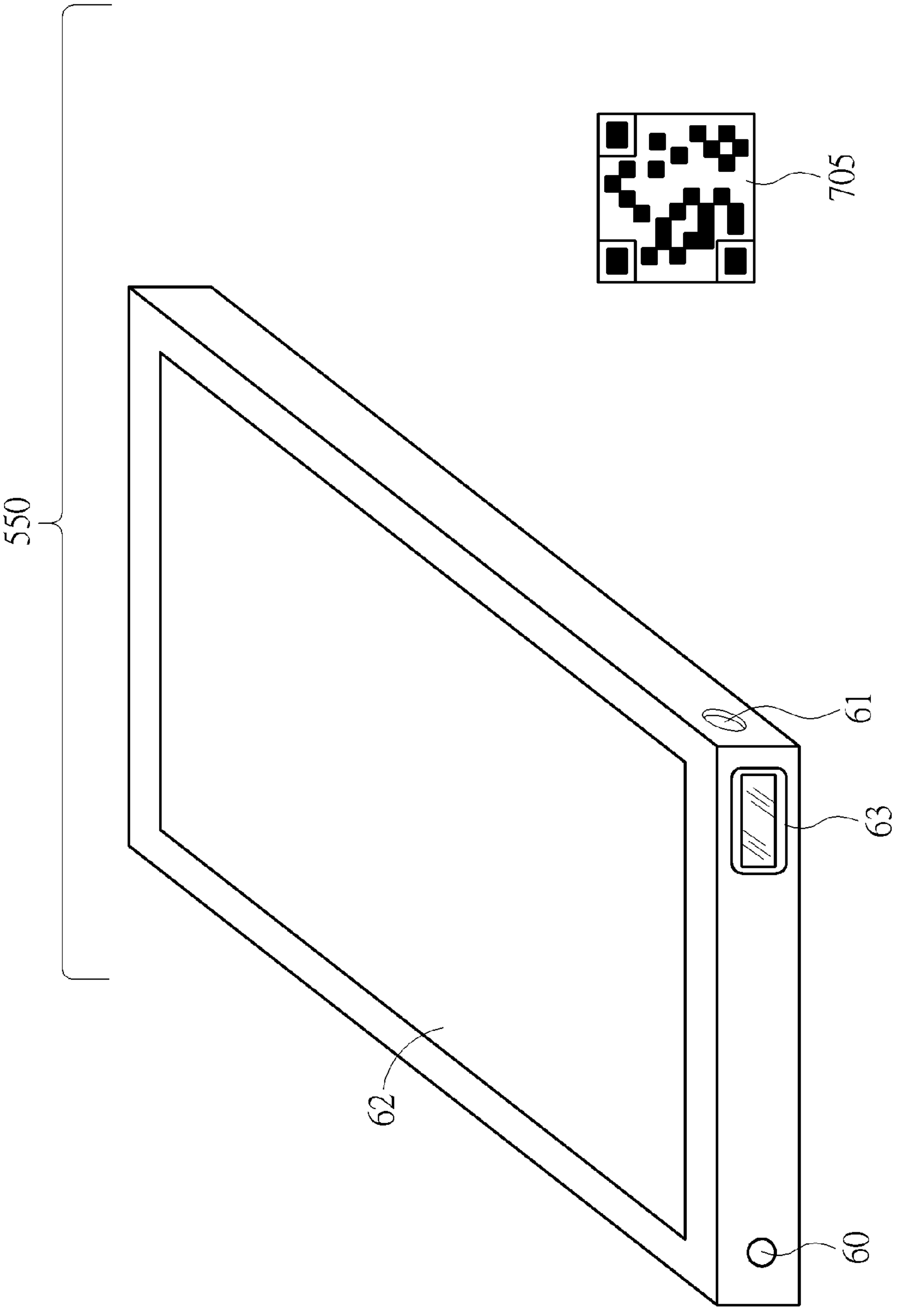
FIG. 10 illustrates a diagram of external components of a universal remote controller according to a sixth embodiment of the present invention.
Figure 11:
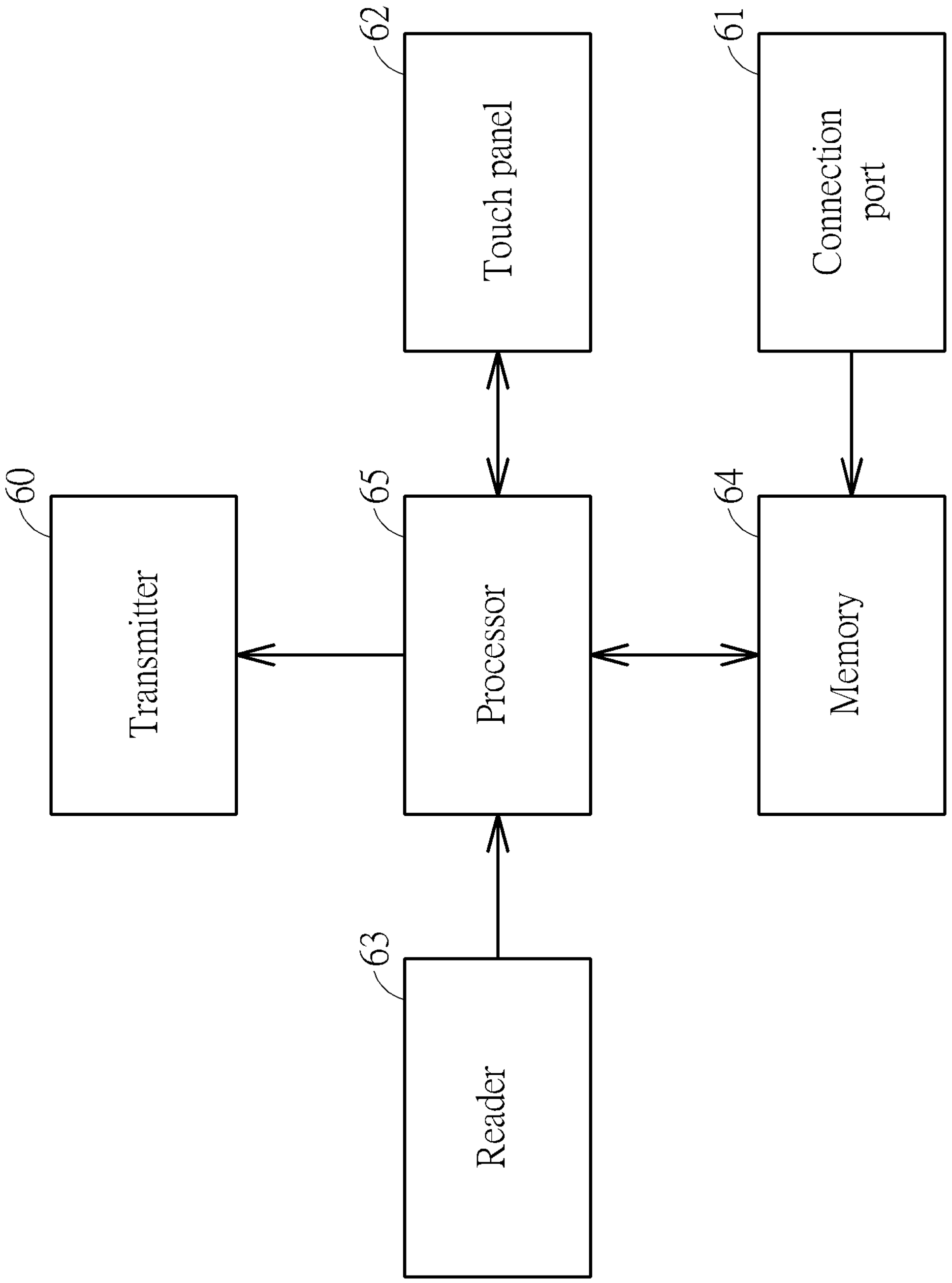
FIG. 11 illustrates a diagram of internal components of the universal remote controller according to the sixth embodiment of the present invention.

FIG. 10 illustrates a diagram of external components of a universal remote controller 550 according to a sixth embodiment of the present invention. FIG. 11 illustrates a diagram of internal components of the universal remote controller 550 according to the sixth embodiment of the present invention. In the embodiment, the universal remote controller 550 may comprise a touch panel 62, a memory 64, a processor 65, a transmitter 60, a reader 63, and a connection port 61. The touch panel 62 may be a display touch panel arranged on one side of the universal remote controller 550 and may be configured to receive a plurality of touch signals from a user and display a plurality of key images. The memory 64 may be configured to store a plurality of databases. The same as the memory of the second embodiment, each of the plurality of databases in the memory 64 of the embodiment may store the positions corresponding to the keys of an exclusive remote controller, and a plurality of key images and a plurality of remote control functions corresponding to the positions of the keys. The plurality of databases stored in the memory 64 of the universal remote controller 550 may correspondingly store positions of keys of the plurality of exclusive remote controllers and store remote control functions and key images corresponding to positions of keys. The processor 65 may execute a corresponding driving process of an exclusive remote controller according to an information tag 705 scanned by the reader 63. The reader 63 may be a scanning device. The driving process of the universal remote controller 550 is described in the following section. The transmitter 60 may be a wireless signal transmitter configured to transmit remote control signals corresponding to the plurality of remote control functions when touch panel 62 receives a plurality of touch signals. The connection port 61 may be used to update the plurality of databases of the memory 64 by using the connection port 61 to input information needed to update the plurality of databases to the universal remote controller 550. Similar to the first to fifth embodiment, the connection port 64 may be a wired connection port or a wireless connection port. As shown in FIG. 11, the processor 65 may be coupled to the memory 64, the transmitter 60, the touch panel 62 and the reader 63. And, the connection port 61 may be coupled to the memory 64. The following sections are examples of operations of the universal remote controller 550.

An exclusive remote controller A may have 30 keys. Each of the 30 keys corresponds to different remote control functions and is placed in different positions of the exclusive remote controller A. When the user is setting up the universal remote controller 550 to have all the remote control functions of the exclusive remote controller A, first, the user may obtain an information tag 705 corresponding to the exclusive remote controller A and scan the information tag 705 using the reader 63 of the universal remote controller 550. The information tag 705 may be an identification code provided by the remote control manufacturer, i.e. Quick Response Code (QR Code), Bar Code, etc. When the reader 63 of the universal remote controller 550 scans the information tag 705, the processor 65 may determine if the information tag 705 is a legitimate information tag of an exclusive remote controller. If the information tag 705 is not legitimate (i.e. the information tag 705 is blurred or incorrect), the processor 65 may not proceed to the next operation. If the information tag 705 is legitimate, the processor 65 may proceed with the operation by searching a corresponding database of the exclusive remote controller A from the plurality of databases of the memory 64. Similar to the second embodiment, the corresponding database of the exclusive remote controller A comprises the positions of the 30 keys of the exclusive remote controller A and the remote control functions and key images corresponding to the positions of the 30 keys. The processor 65 may display the 30 keys of the exclusive remote controller A on the touch panel 62 according to the information on the database. The key images displayed on the touch panel 62 having similar positions and images of the keys of the exclusive remote controller A. The processor 65 may link the key images displayed on the touch panel 62 with corresponding remote control functions. When the user is using the universal remote controller 550, the key images corresponding to the 30 keys of the exclusive remote controller A may be displayed on the touch panel 62. And because the processor 65 has linked remote control functions to key images displayed on the touch panel 62, when a touch signal is inputted to the touch panel 62 by the user (the touch signal corresponds to a position of a key image on the touch panel 62), the touch signal received from the touch panel 62 may then be returned to the processor 65 and the processor 65 may execute a corresponding remote control function of the touch signal. And the transmitter 60 may transmit remote control signal corresponding to the remote control function executed.

However if the information tag 705 scanned by the user using the reader 63 is legitimate but the plurality of databases of the memory 64 does not have a corresponding database for the exclusive remote controller A (i.e. the exclusive remote controller A may be an old model or the newest model of remote controller), the universal remote controller 550 may notify the user to use the connection port 61 to download the database of the exclusive remote controller A. Furthermore, if the user wants to change the exclusive remote controller corresponding to the universal remote controller 550 to a different exclusive remote controller, the user may scan the information tag 705 corresponding to the different exclusive remote controller.

Figure 12:
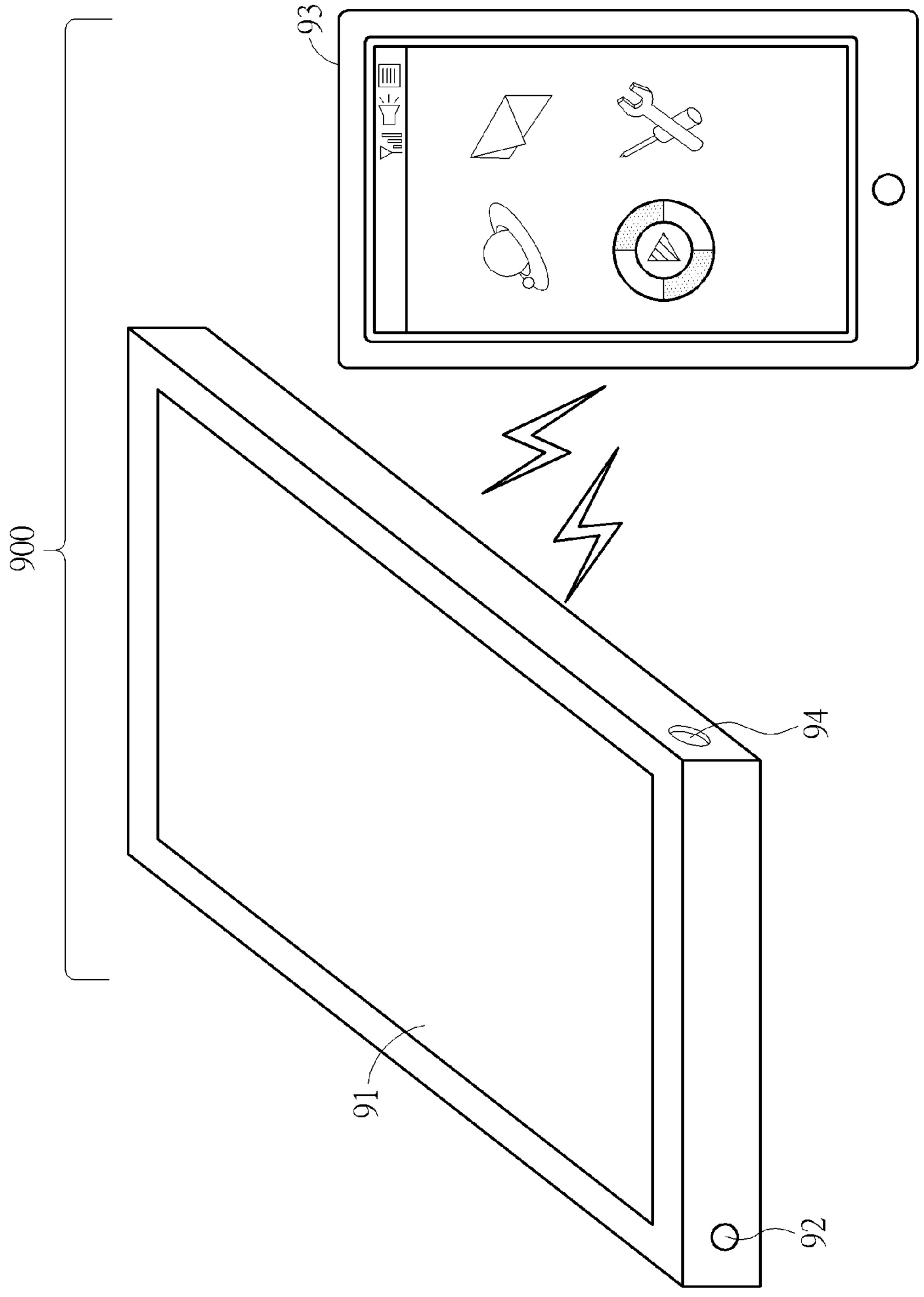
FIG. 12 illustrates a diagram of a remote control system according to a seventh embodiment of the present invention.
Figure 13:
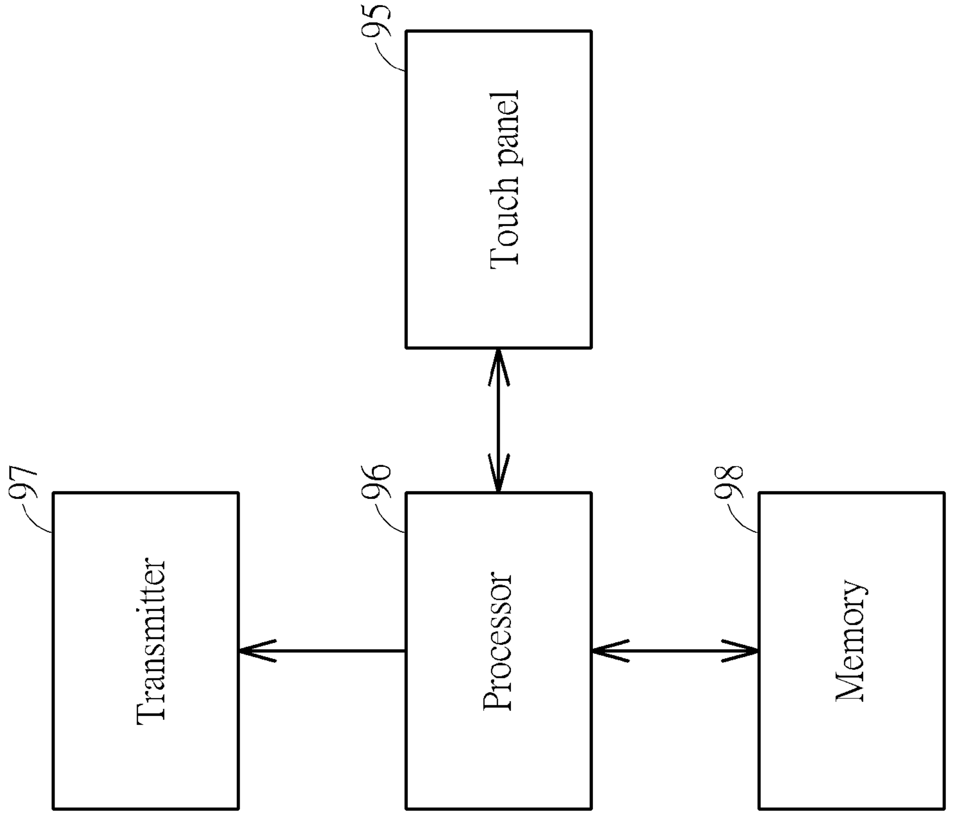
FIG. 13 illustrates a diagram of internal components of a portable electronic device corresponding to the remote control system in FIG. 12.
Figure 14:
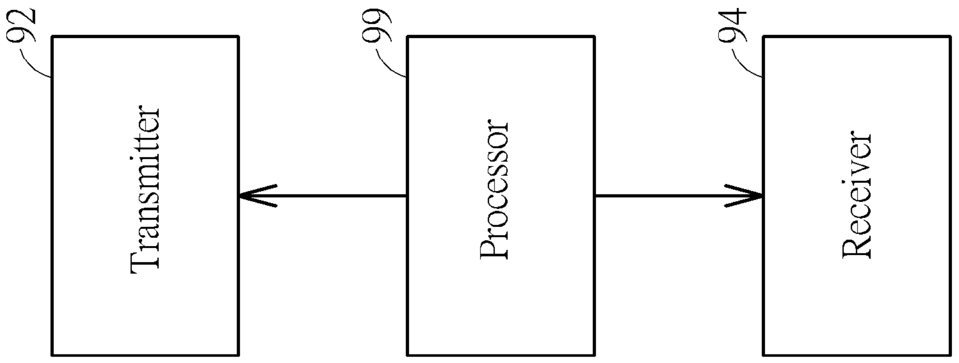
FIG. 14 illustrates a diagram of internal components of the universal remote controller corresponding to the remote control system in FIG. 12.

FIG. 12 illustrates a diagram of a remote control system 900 according to a seventh embodiment of the present invention. FIG. 13 illustrates a diagram of internal components of a portable electronic device 93 corresponding to the remote control system 900 in FIG. 12. FIG. 14 illustrates a diagram of internal components of the universal remote controller corresponding to the remote control system 900 in FIG. 12. In the embodiment, the remote control system 900 may comprise the portable electronic device 93 and a universal remote controller 91. The portable electronic device 93 may be an electronic device capable of sending and receiving wireless signals, i.e. a smart phone, a tablet, etc. As shown in FIG. 13, the portable electronic device 93 may comprise a touch panel 95, a memory 98, a processor 96 and a transmitter 97. The touch panel 95 may be a display touch panel arranged on one side of the portable electronic device 93 and configured to receive a plurality of touch signals from a user and display a plurality of key images. The memory 98 may be configured to store a plurality of databases. Each of the plurality of databases in the memory 98 may store the positions corresponding to the keys of an exclusive remote controller, and a plurality of key images and a plurality of remote control functions corresponding to the positions of the keys. For example, database A may store positions of the 30 keys of the exclusive remote controller A and corresponding remote control functions and key images of the positions of the 30 keys. The memory 98 corresponding to the portable electronic device 93 may be configured to store a plurality of databases and correspondingly store positions of keys of the plurality of exclusive remote controller and remote control functions and key images corresponding to positions of keys. When the user inputs a selecting signal to the portable electronic device 93 (i.e. the user inputs a selecting signal through the touch panel 95 for the remote control system 900 execute the remote control functions of the exclusive remote controller A), the processor 96 may be configured to execute a corresponding driving process of the exclusive remote controller A according to the selecting signal. The driving process of the universal remote controller 900 is described in the following section. The transmitter 97 may be an electromagnetic signal transmitter and may be configured to transmit a first set of remote control signals correspondingly when the touch panel 95 receives a plurality of touch signals. As shown in FIG. 13, the processor 96 of the portable electronic device 93 may be coupled to the memory 98, the transmitter 97 and the touch panel 95. The universal remote controller 91 may comprise a receiver 94, a processor 99 and a transmitter 92. The receiver 94 may be configured to receive the first set of remote control signals transmitted by the transmitter 97 of the portable electronic device 93. The processor 99 may be configured to transform the first set of remote control signals transmitted by the transmitter 92 of the portable electronic device 93 to a second set of remote control signals. The transmitter 92 may be configured to transmit the second set of remote control signals. As shown in FIG. 14, the processor 99 of the universal remote controller 91 may be coupled to the transmitter 92 and the receiver 94. The following sections are examples of operations of the remote control system 900.

An exclusive remote controller A may have 30 keys. Each of the 30 keys corresponds to different remote control functions and is placed in different positions of the exclusive remote controller A. When the user is setting up the remote control system 900 to have all the remote control functions of the exclusive remote controller A, first, the user may link portable electronic device 93 and the universal remote controller 91. The application program or software of the portable electronic device 93 may use the internet to perform the link. Afterwards, the user may input a selecting signal to the portable electronic device 93, wherein the selecting signal may point to the exclusive remote controller A. For example, the portable electronic device 93 uses a remote controller application program to select an exclusive remote controller on the touch panel 95 (i.e. selecting an exclusive remote controller A). When the portable electronic device 93 receives the selecting signal inputted by the user, the processor 96 may drive a corresponding database stored in the memory 98 to display a corresponding plurality of key images on the touch panel 95 of the portable electronic device 93 according to the selecting signal. The plurality of key images displayed on the touch panel 95 of the portable electronic device 93 may be linked to a corresponding plurality of remote control functions. In this time, when the user is viewing the touch panel 95 of the portable electronic device 93, the user may see key images corresponding to the 30 keys of the exclusive remote controller A on the touch panel 95. And because the processor 96 has linked remote control functions to 30 keys displayed on the touch panel 95, when a touch signal is inputted to the touch panel 95 by the user (the touch signal corresponds to a position of a key image on the touch panel 95), the touch signal received from the touch panel 95 may then be returned to the processor 96 and the processor 96 may execute a corresponding remote control function according to the touch signal. And the transmitter 97 may transmit the first set of remote control signals corresponding to the remote control functions to the universal remote controller 91. In this time, the universal remote controller 91 has linked with the portable electronic device 93. When the universal remote controller 91 uses the receiver 94 to receive the first set of remote control signals from the portable electronic device 93, the processor 99 of the universal remote controller 91 may transform (also known as modulate) the first set of remote control signals to the second set of remote control signals. In this way, the user may use the portable electronic device 93 to execute the remote control functions of the exclusive remote controller A. And, the portable electronic device 93 may use the linked universal remote controller 91 to transmit the second set of remote control signals corresponding to the remote control functions.

Figure 15:
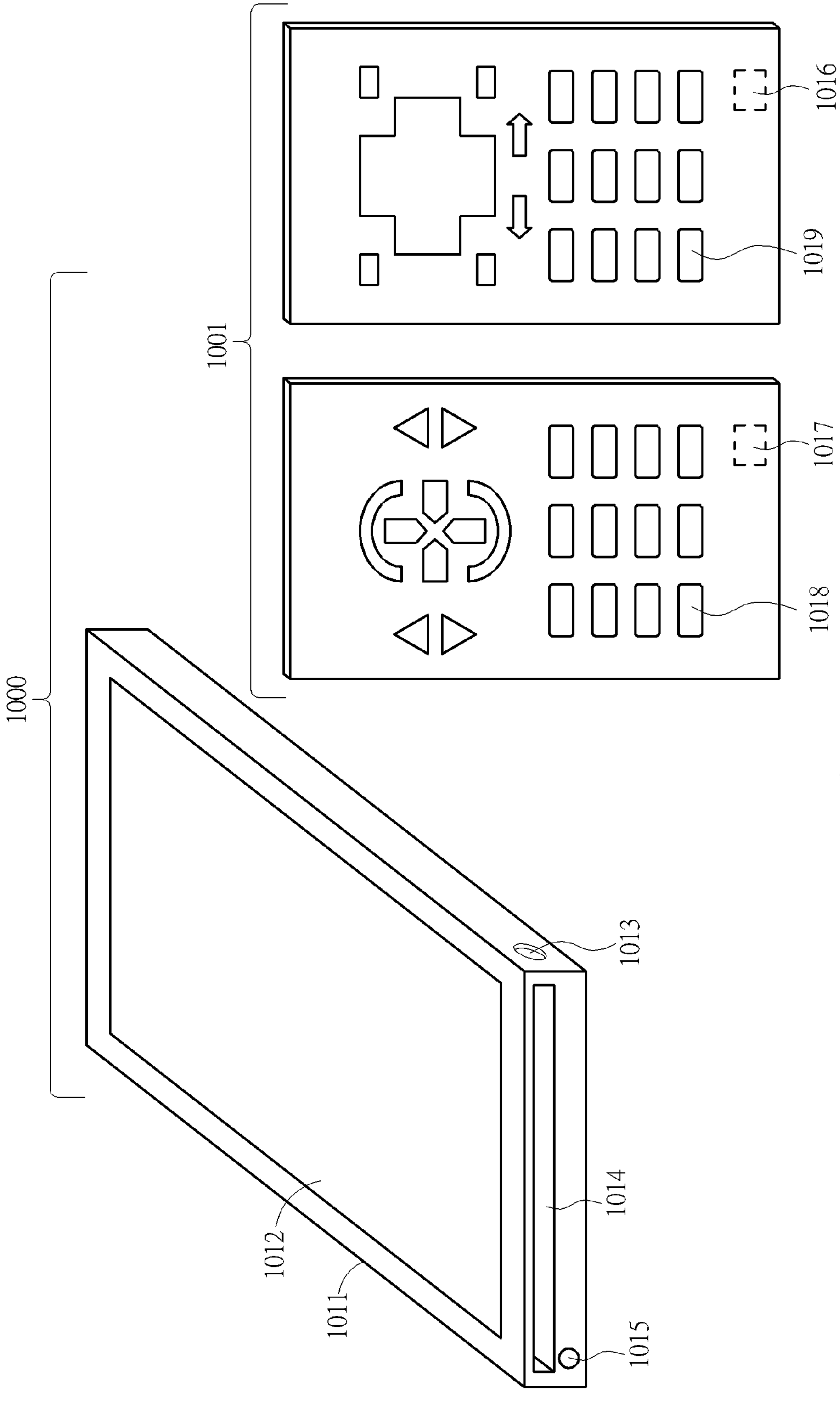
FIG. 15 illustrates a diagram of external components of a universal remote controller according to an eighth embodiment of the present invention.
Figure 16:
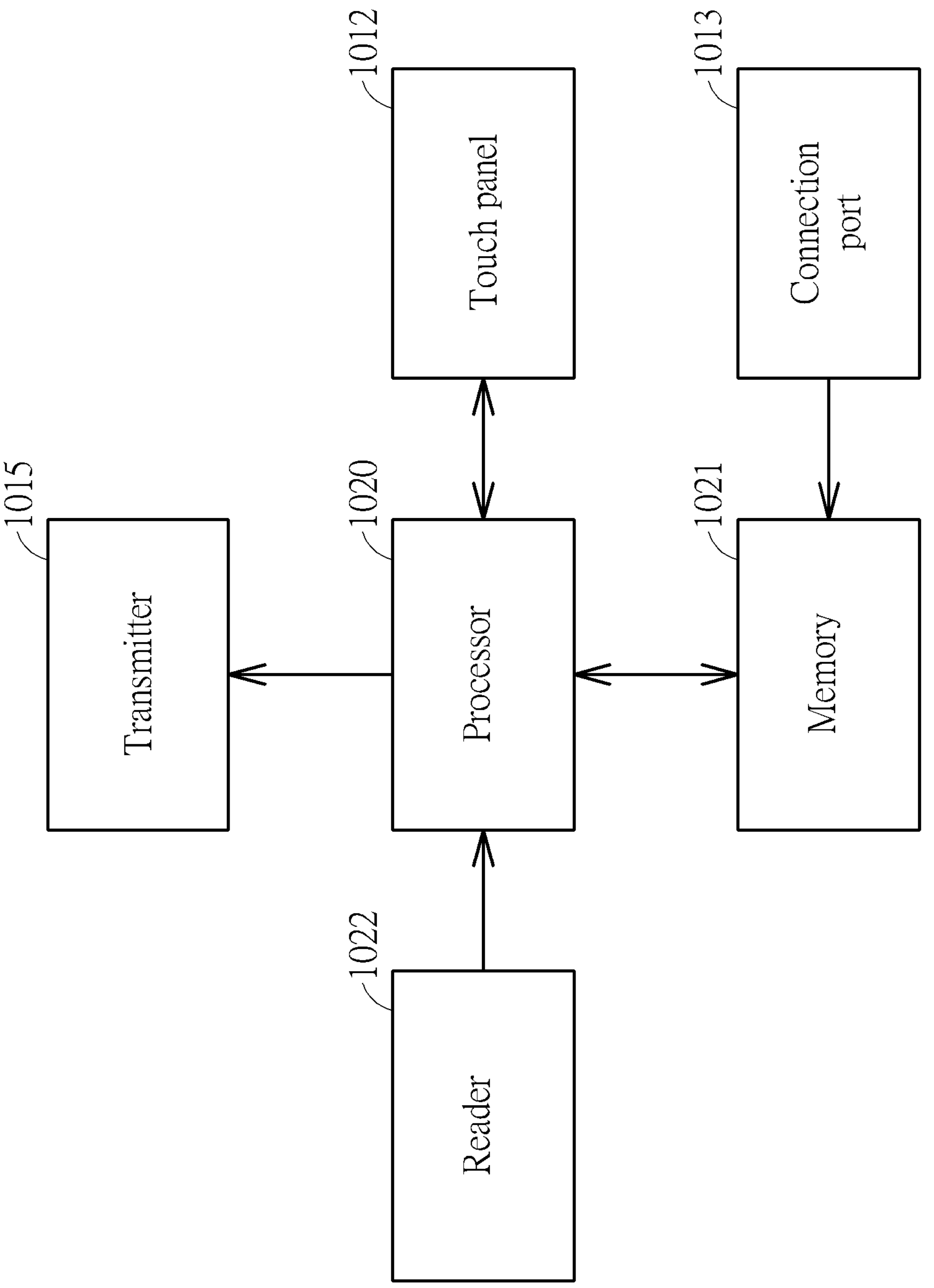
FIG. 16 illustrates a diagram of internal components of the universal remote controller according to the eighth embodiment of the present invention.

FIG. 15 illustrates a diagram of external components of a universal remote controller 1000 according to an eighth embodiment of the present invention. FIG. 16 illustrates a diagram of internal components of the universal remote controller 1000 according to the eighth embodiment of the present invention. In the embodiment, the universal remote controller 1000 comprises a card 1001 and a housing 1011. The card 1001 may be a magnetic graphic card having two sides, each comprising a set of key images 1018 and 1019. The first side comprises a first set of key images 1018 and a first information tag 1017. The second side comprises a second set of key images 1019 and a second information tag 1016. The first side and the second side of the card 1001 may each correspond to a different exclusive remote controller. And, the first set of key images 1018 of the first side of the card 1001 may correspond to each of the keys of an exclusive remote controller and the second set of key images 1019 of the second side of the card 1001 may correspond to each of the keys of another exclusive remote controller. For example, an exclusive remote controller A may have 30 keys. If the first side of the card 1001 corresponds to the exclusive remote controller A, the first side of the card 1001 may have 30 key images. An exclusive remote controller B may have 20 keys. If the second side of the card 1001 corresponds to the exclusive remote controller B, the second side of the card 1001 may have 20 key images. Using the first information tag 1017 of the first side of the card 1001, a driving signal corresponding to the exclusive remote controller A may be generated to drive the universal remote controller 1000. When using the second information tag 1016 of the second side of the card 1001, a driving signal corresponding to the exclusive remote controller B may be generated to drive the universal remote controller 1000. The driving process of the universal remote controller 1000 is described in the following section. In the embodiment, the first information tag 1017 and the second information tag 1016 may be a contacting sensor chip or a non-contacting sensor chip. The housing 1011 may comprise of a touch panel 1012, a slot 1014, a reader 1022, a memory 1021, a processor 1020, a transmitter 1015, and a connection port 1013. Each of the components of the housing 1011 may function the same as the components of the housing 13 of the first embodiment, therefore, would no longer be described further for brevity.

Here is a description of an example of an operation of the universal remote controller 1000. An exclusive remote controller A may have 30 keys. An exclusive remote controller B may have 20 keys. Each of the 30 keys of the exclusive remote controller A corresponds to different remote control functions and is placed in different positions of the exclusive remote controller A. Each of the 20 keys of the exclusive remote controller B corresponds to different remote control functions and is placed in different positions of the exclusive remote controller B. For the user to set up the universal remote controller 1000 to have all the functions of the exclusive remote controller A or the exclusive remote controller B, first, the user may insert the card 1001 to the slot 1014 of the universal remote controller 1000. If the first side is facing the touch panel 1012, the information tag 1017 on the first side may be used to generate a driving signal corresponding to the exclusive remote controller A. If the second side is facing the touch panel 1012, the information tag 1016 on the first side may be used to generate a driving signal corresponding to the exclusive remote controller B. Note that the second side of the card 1001 is the flipped side of the first side of the card 1001. The first information tag 1017 of the first side of the card 1001 and the second information tag 1016 of the second side of the card 1001 may be set on the same position on each side of the card 1001. When the reader 1022 inside the housing 1011 outputs the driving signal, the driving signal may be sent to the processor 1020. The processor 1020 may determine if the (a first driving signal or a second driving signal) is legitimate; the driving signal corresponds to an exclusive remote controller. If the driving signal is not legitimate, the processor 1020 may not proceed to the next operation. If the driving signal is legitimate, the processor 1020 may proceed with the operation by searching a corresponding database of the exclusive remote controller from the plurality of databases of the memory 1021. For example, if the first driving signal is received and the first driving signal is a legitimate driving signal, the first driving signal may correspond to the exclusive remote controller A and the processor 1020 may search for the corresponding database of the exclusive remote controller A from the plurality of databases of the memory 1021. If the second driving signal is received and the second driving signal is a legitimate driving signal, the second driving signal may correspond to the exclusive remote controller B and the processor 1020 may search for the corresponding database of the exclusive remote controller B from the plurality of databases of the memory 1021. At this time, the processor 1020 may determine corresponding positions of the keys of the exclusive remote controller on the touch panel 1012 according to the information on the database and link a remote control function to each of the positions of the keys. When the user is using the universal remote controller 1000, the 30 key images of the exclusive remote controller A on the first side of the card 1001 may be viewed through the touch panel 1012 or the 20 key images of the exclusive remote controller B on the second side of the card 1001 may be viewed through the touch panel 1012. When a touch signal is inputted to the touch panel 1012 by the user (the touch signal corresponds to a position of a key image of the exclusive remote controller A or the exclusive remote controller B on the touch panel 1012), the touch signal received from the touch panel 1012 may then be returned to the processor 1020 and the processor 1020 may execute a corresponding remote control function of the exclusive remote controller A or the exclusive remote controller B according to the touch signal. And the transmitter 1015 may transmit a remote control signal corresponding to the remote control function.

However, if the driving signal generated is a legitimate driving signal but the plurality of databases of the memory 1021 does not have a corresponding database for the exclusive remote controller A and the exclusive remote controller B (i.e. the exclusive remote controller A or the exclusive remote controller B may be an old model or the newest model of remote controller), the universal remote controller 1000 may use the reader 1022 or the connection port 1013 to update or download the database of the universal remote controller 1000 in the same way as described in the first embodiment, therefore, would no longer be described for brevity. Furthermore, if the user wants to change the two exclusive remote controllers corresponding to the universal remote controller 1000 to two different exclusive remote controllers, the card 1001 may be changed to a card 1001 corresponding to the two different exclusive remote controllers. In addition, if the user wants to set the universal remote controller 1000 to have all of the remote control functions of an exclusive remote controller C or an exclusive remote controller D, the user may insert a card 1001 corresponding to the exclusive remote controller C and the exclusive remote controller D into the slot 1014.

Figure 17:
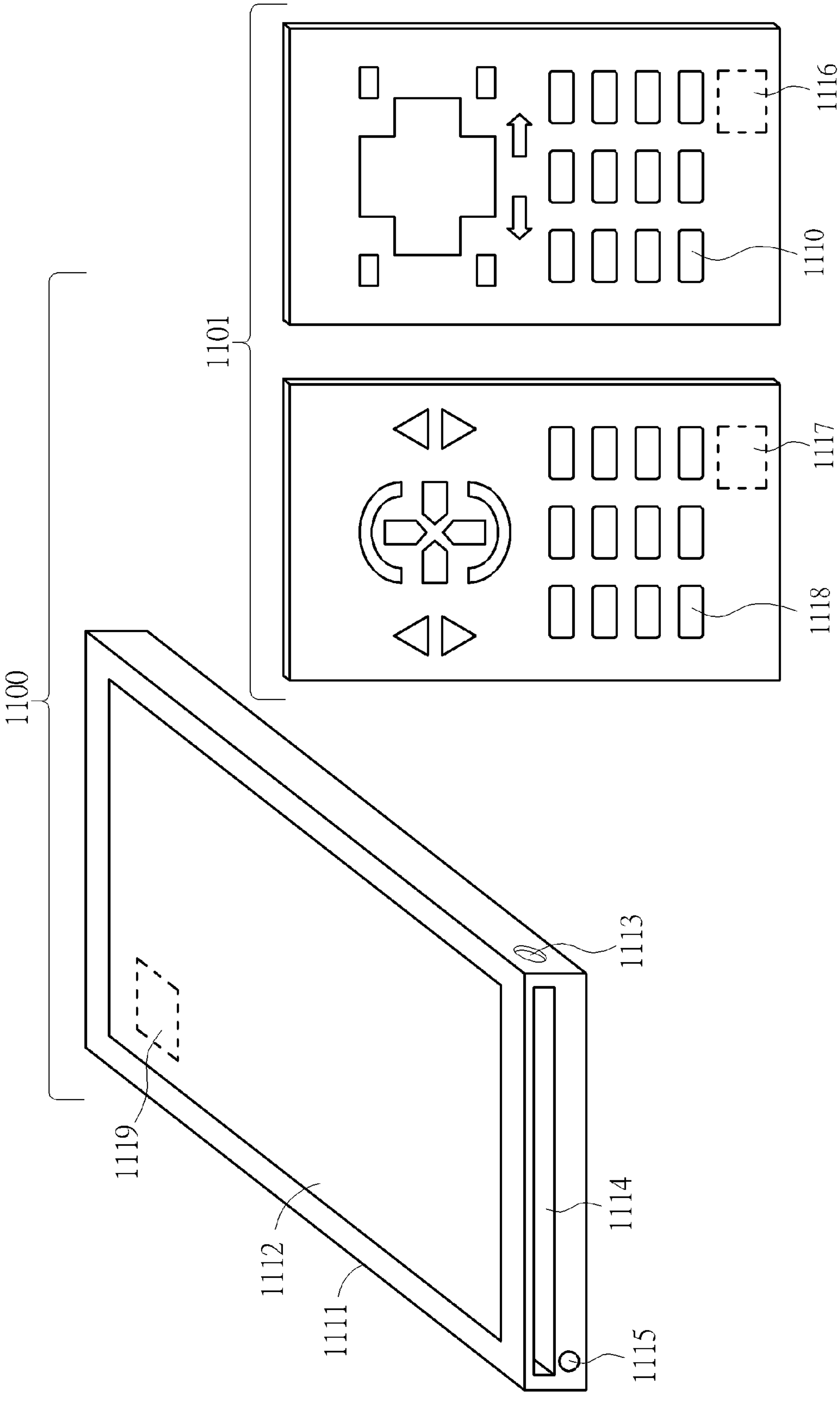
FIG. 17 illustrates a diagram of external components of a universal remote controller according to a ninth embodiment of the present invention.
Figure 18:
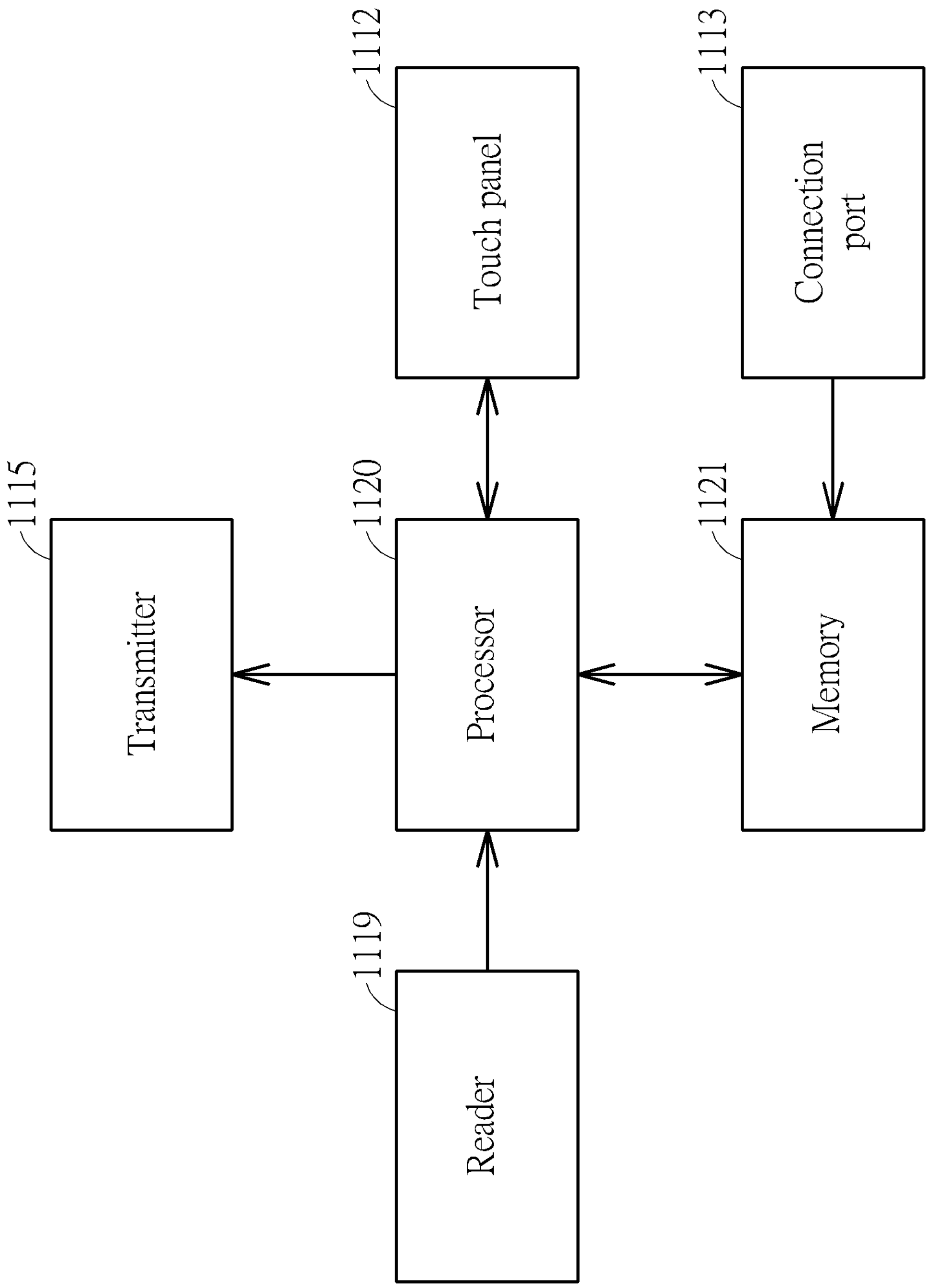
FIG. 18 illustrates a diagram of internal components of the universal remote controller according to the ninth embodiment of the present invention.

FIG. 17 illustrates a diagram of external components of a universal remote controller 1100 according to a ninth embodiment of the present invention. FIG. 18 illustrates a diagram of internal components of the universal remote controller 1100 according to the ninth embodiment of the present invention. In the embodiment, the universal remote controller 1100 comprises a card 1101 and a housing 1111. The housing 1111 may be the same as the housing 73 of the universal remote controller 700 in the third embodiment. The card 1101 may have two sides, two sides, each comprising a set of key images 1118 and 1110. The first side comprises a first set of key images 1118 and a first information tag 1117. The second side comprises a second set of key images 1110 and a second information tag 1116. The first side and the second side of the card 1101 may each correspond to a different exclusive remote controller. And, the first set of key images 1118 of the first side of the card 1101 may correspond to each of the keys of an exclusive remote controller and the second set of key images 1110 of the second side of the card 1101 may correspond to each of the keys of another exclusive remote controller. For example, an exclusive remote controller A may have 30 keys. If the first side of the card 1101 corresponds to the exclusive remote controller A, the first side of the card 1101 may have 30 key images. An exclusive remote controller B may have 20 keys. If the second side of the card 1101 corresponds to the exclusive remote controller B, the second side of the card 1101 may have 20 key images. When using the first information tag 1117 of the first side of the card 1101, a driving signal corresponding to the exclusive remote controller A may be generated to drive the universal remote controller 1100. When using the second information tag 1116 of the second side of the card 1101, a driving signal corresponding to the exclusive remote controller B may be generated to drive the universal remote controller 1100. The driving process of the universal remote controller 1100 is described in the following section. The housing 1111 may comprise of a touch panel 1112, a slot 1114, a reader 1119, a memory 1121, a processor 1120, a transmitter 1115, and a connection port 1113. Each of the components of the housing 1111 may function the same as the components of the housing 73 of the third embodiment, therefore, would no longer be described further for brevity.

Here is a description of an example of an operation of the universal remote controller 1100. An exclusive remote controller A may have 30 keys. An exclusive remote controller B may have 20 keys. Each of the 30 keys of the exclusive remote controller A corresponds to a different remote control function and is placed in a different position on the exclusive remote controller A. Each of the 20 keys of the exclusive remote controller B corresponds to a different remote control function and is placed in a different position on the exclusive remote controller B. For the user to set up the universal remote controller 1100 to have all the remote control functions of the exclusive remote controller A or the exclusive remote controller B, first, the user may insert the card 1001 to the slot 1114 of the universal remote controller 1100. If the first side is facing the touch panel 1112, the information tag 1117 may be scanned using the reader 1119 and used to generate a driving signal corresponding to the exclusive remote controller A to transmit to the processor 1120. If the second side is facing the touch panel 1112, the information tag 1116 may be scanned using the reader 1119 and used to generate a driving signal corresponding to the exclusive remote controller B to transmit to the processor 1120. Note that the second side of the card 1101 is the flipped side of the first side of the card 1101. The first information tag 1117 of the first side of the card 1101 and the second information tag 1116 of the second side of the card 1101 may be set on the same position corresponding to each side of the card 1101. The processor 1120 may determine if the driving signal (a first driving signal or a second driving signal) is legitimate; the driving signal corresponds to an exclusive remote controller. If the driving signal is not legitimate, the processor 1120 may not proceed to the next operation. If the driving signal is legitimate, the processor 1120 may proceed with the operation by searching a corresponding database of the exclusive remote controller from the plurality of databases of the memory 1121. For example, if the first driving signal is received and the first driving signal is a legitimate driving signal, the first driving signal may correspond to the exclusive remote controller A and the processor 1120 may search for the corresponding database of the exclusive remote controller A from the plurality of databases of the memory 1121. If the second driving signal is received and the second driving signal is a legitimate driving signal, the second driving signal may correspond to the exclusive remote controller B and the processor 1020 may search for the corresponding database of the exclusive remote controller B from the plurality of databases of the memory 1121. At this time, the processor 1120 may determine corresponding positions of the keys of the exclusive remote controller on the touch panel 1112 according to the information on the database and link a remote control function to each of the positions of the keys. When the user is using the universal remote controller 1100, the 30 key images of the exclusive remote controller A on the first side of the card 1101 may be viewed through the touch panel 1012 or the 20 key images of the exclusive remote controller B on the second side of the card 1101 may be viewed through the touch panel 1112. When a touch signal is inputted to the touch panel 1112 by the user (the touch signal corresponds to a position of a key image of the exclusive remote controller A or the exclusive remote controller B on the touch panel 1112), the touch signal received from the touch panel 1112 may then be returned to the processor 1120 and the processor 1120 may execute a corresponding remote control function of the exclusive remote controller A or the exclusive remote controller B according to the touch signal. And the transmitter 1115 may transmit a remote control signal corresponding to the remote control function executed.

However, if the driving signal generated is a legitimate driving signal but the plurality of databases of the memory 1121 does not have a corresponding database for the exclusive remote controller A and the exclusive remote controller B (i.e. the exclusive remote controller A or the exclusive remote controller B may be an old model or the newest model of remote controller), the universal remote controller 1100 may use the reader 1022 or the connection port 1113 to update or download a database on the universal remote controller 1100 in the same way as described in the third embodiment, therefore, would no longer be described for brevity. Furthermore, if the user wants to change the two exclusive remote controllers corresponding to the universal remote controller 1000 to two different exclusive remote controllers, the card 1101 may be changed to a card 1101 corresponding to the two different exclusive remote controllers. In addition, if the user wants to set the universal remote controller 1100 to have all of the remote control functions of an exclusive remote controller C or an exclusive remote controller D, the user may insert a card 1101 corresponding to the exclusive remote controller C and the exclusive remote controller D into the slot 1114.

In the tenth embodiment of the present invention, the universal remote controller may have the same components and driving process as disclosed in the first embodiment. The difference is that the universal remote controller of the tenth embodiment may use two cards, a first card and a second card. The two cards may be magnetic graphic cards. The first card may have a first set of key images and the second card may have a second set of key images. The two sets of key images may correspond to two different exclusive remote controllers. The first card may have a first information tag and the second card may have a second information tag. A first driving signal and a second driving signal may be generated separately when using the two information tags. The driving process of the universal remote controller of the tenth embodiment is described in the following section. The housing of the universal remote controller of the tenth embodiment comprises of the same components of the universal remote controller 100 of the first embodiment with the difference of having two touch panels, two slots, and two readers. The two touch panels may comprise a first touch panel and a second touch panel. The two slots may comprise a first slot and a second slot. The two readers may comprise of a first reader and a second reader. The following sections are examples of operations of the universal remote controller of the tenth embodiment.

An exclusive remote controller A may have 30 keys. An exclusive remote controller B may have 20 keys. Each of the 30 keys of the exclusive remote controller A corresponds to different remote control functions and is placed in different positions of the exclusive remote controller A. Each of the 20 keys of the exclusive remote controller B corresponds to different remote control functions and is placed in different positions of the exclusive remote controller B. For the user to set up the universal remote controller to have all the remote control functions of the exclusive remote controller A and the exclusive remote controller B, first, the user may insert the first card corresponding to the exclusive remote controller A to the first slot and insert the second card corresponding to the exclusive remote controller B to the second slot. In this time, the first information tag of the first card may be used to generate a first driving signal corresponding to the exclusive remote controller A and the second information tag of the second card may be used to generate a second driving signal corresponding to the exclusive remote controller B. When the first reader inside the housing outputs the first driving signal, the first driving signal may be sent to the processor. The processor may determine if the first driving signal is legitimate; the first driving signal corresponding to an exclusive remote controller. If the first driving signal is not legitimate, the processor may not proceed to the next operation. In the same way, when the second reader inside the housing outputs the second driving signal, the second driving signal may be sent to the processor. The processor may determine if the second driving signal is legitimate; the second driving signal corresponds to an exclusive remote controller. If the second driving signal is not legitimate, the processor may not proceed to the next operation. If the driving signals are legitimate, the processor may proceed with the operation by searching a first database corresponding to the exclusive remote controller A and a second database corresponding to the exclusive remote controller B from the plurality of databases of the memory. The first database of the exclusive remote controller A may comprise the positions and the 30 remote control functions of the exclusive remote controller A. At this time, the processor may determine the corresponding positions of the 30 keys of the exclusive remote controller A on the first touch panel according to the information on the first database and link a remote control function to each of the positions of the 30 keys. The second database of the exclusive remote controller B comprises the positions and the 20 remote control functions of the exclusive remote controller B. At this time, the processor may determine corresponding positions of the 20 keys of the exclusive remote controller B on the second touch panel according to the information on the second database and link a remote control function to each of the positions of the 20 keys. When the user is using the universal remote controller, the 30 key images on the first card may be viewed through the first touch panel and the 20 key images on the second card may be viewed through the second touch panel. And because the processor has linked remote control functions to 30 key positions on the first touch panel and linked remote control functions to 20 key positions on the second touch panel, when a first touch signal is inputted to the first touch panel by the user (the first touch signal corresponds to a position of a key image on the first touch panel), the first touch signal received from the first touch panel may then be returned to the processor and the processor may execute a first remote control function according to the first touch signal. And the transmitter may transmit remote control signal corresponding to the first remote control function. When a second touch signal is inputted to the second touch panel by the user (the second touch signal corresponds to a position of a key image on the second touch panel), the second touch signal received from the second touch panel may then be returned to the processor and the processor may execute a second remote control function according to the second touch signal. And the transmitter may transmit remote control signal corresponding to the second remote control function.

In the tenth embodiment, the connection port may be used to update the plurality of databases of the memory. If the user set up the universal remote controller to have all the remote control functions of an exclusive remote controller, the universal remote controller of the tenth embodiment may use the same process as described in the first embodiment, thus, would no longer be described for brevity.

In an eleventh embodiment of the present invention, the universal remote controller may have the same components and driving process as disclosed in the second embodiment. The difference is that the universal remote controller of the eleventh embodiment may use two cards, a first card and a second card. The two cards may each be a sensor chip. Each of the two cards may be a Radio Frequency Identification (RFID), or a chip that is able to store information like a Secure Digital Memory Card (SD Card), Micro-Secure Digital Memory Card (Micro-SD Card), etc. When the two cards are being used, the two cards may be used to generate a first driving signal and a second driving signal. The driving process of the universal remote controller is described in the following section. Another difference from the second embodiment is that the universal remote controller of the eleventh embodiment may have two touch panels, two slots, and two readers. The two touch panels may comprise a first touch panel and a second touch panel. The two slots may comprise a first slot and a second slot. The two readers may comprise of a first reader and a second reader. The following sections are examples of operations of the universal remote controller of the tenth embodiment.

An exclusive remote controller A may have 30 keys. An exclusive remote controller B may have 20 keys. Each of the 30 keys of the exclusive remote controller A corresponds to different remote control functions and is placed in different positions of the exclusive remote controller A. Each of the 20 keys of the exclusive remote controller B corresponds to different remote control functions and is placed in different positions of the exclusive remote controller B. For the user to set up the universal remote controller to have all the remote control functions of the exclusive remote controller A and the exclusive remote controller B, first, the user may insert the first card corresponding to the exclusive remote controller A to the first slot and insert the second card corresponding to the exclusive remote controller B to the second slot. In this time, the first information tag of the first card may be used to generate a first driving signal corresponding to the exclusive remote controller A and the second information tag of the second card may be used to generate a second driving signal corresponding to the exclusive remote controller B. When the first reader inside the housing outputs the first driving signal, the first driving signal may be sent to the processor. When the second reader inside the housing outputs the second driving signal, the second driving signal may be sent to the processor. The processor may determine if the two driving signals are legitimate. And, from the plurality of databases of the memory, search for a first database corresponding to the exclusive remote controller A and a second database corresponding to the exclusive remote controller B by using a method as described in the eight embodiment. Next, the processor may respectively display the key images corresponding to the exclusive remote controller A and the exclusive remote controller B respectively on the first touch panel and the second touch panel. The processor may determine corresponding positions of the keys of the exclusive remote controller A and the exclusive remote controller B on the first touch panel and the second touch panel and link a remote control function to each of the positions. When the user is using the universal remote controller, the 30 key images corresponding to the first card may be viewed through the first touch panel and the 20 key images corresponding to the second card may be viewed through the second touch panel. And because the processor has linked remote control functions to positions of the 30 keys on the first touch panel and linked remote control functions to positions of the 20 keys on the second touch panel, when a first touch signal is inputted to the first touch panel by the user (the first touch signal corresponds to a position of a key image on the first touch panel), the first touch signal received from the first touch panel may then be returned to the processor and the processor may execute a first remote control function according to the first touch signal. And the transmitter may transmit remote control signal corresponding to the first remote control function. When a second touch signal is inputted to the second touch panel by the user (the second touch signal corresponds to a position of a key image on the second touch panel), the second touch signal received from the second touch panel may then be returned to the processor and the processor may execute a second remote control function according to the second touch signal. And the transmitter may transmit remote control signal corresponding to the second remote control function.

In the eleventh embodiment, the connection port may be used to update the plurality of databases of the memory. If the user set up the universal remote controller to have all the remote control functions of an exclusive remote controller, the universal remote controller of the eleventh embodiment may use the same process as described in the second embodiment, thus, would no longer be described for brevity.

In the twelfth embodiment of the present invention, the universal remote controller may have the same components and driving process as disclosed in the third embodiment. The difference is that the universal remote controller of the twelfth embodiment may use two cards, a first card and a second card. The two cards may be a magnetic graphic card. The first card may have a first set of key images and the second card may have a second set of key images. The two sets of key images may correspond to two different exclusive remote controllers. The first card may have a first information tag and the second card may have a second information tag. The driving process of the universal remote controller of the tenth embodiment is described in the following section. The housing of the universal remote controller of the twelfth embodiment comprises of the same components of the universal remote controller 700 of the third embodiment with the difference of having two touch panels, two slots, and two readers. The two touch panels may comprise a first touch panel and a second touch panel. The two slots may comprise a first slot and a second slot. The two readers may comprise of a first reader and a second reader. The following sections are examples of operations of the universal remote controller of the tenth embodiment.

An exclusive remote controller A may have 30 keys. An exclusive remote controller B may have 20 keys. Each of the 30 keys of the exclusive remote controller A corresponds to different remote control functions and is placed in different positions of the exclusive remote controller A. Each of the 20 keys of the exclusive remote controller B corresponds to different remote control functions and is placed in different positions of the exclusive remote controller B. For the user to set up the universal remote controller to have all the remote control functions of the exclusive remote controller A and the exclusive remote controller B, first, the user may insert the first card corresponding to the exclusive remote controller A to the first slot and insert the second card corresponding to the exclusive remote controller B to the second slot. The first card and the second card may respectively be inserted into the first slot and second slot simultaneously or individually and individually generate a first driving signal corresponding to the exclusive remote controller A and a second driving signal corresponding to the exclusive remote controller B. The processor may individually determine if the two driving signals are legitimate; each of the two driving signals corresponds to an exclusive remote controller. If a driving signal of the two driving signals is not legitimate (i.e. the information tag may be blurred or incorrect), the processor may not proceed to the next operation. If the two driving signals are legitimate, the processor may proceed with the operation by searching a first database of the exclusive remote controller A and a second database of the exclusive remote controller B from the plurality of databases of the memory. The first database of the exclusive remote controller A may comprise the positions and the remote control functions of the 30 keys of the exclusive remote controller A. At this time, the processor may determine corresponding positions of the 30 keys of the exclusive remote controller A on the first touch panel according to the information on the first database and link a remote control function to each of the positions of the 30 keys. The second database of the exclusive remote controller B comprises the positions and the remote control functions of the 20 keys of the exclusive remote controller B. At this time, the processor may determine corresponding positions of the 20 keys of the exclusive remote controller B on the second touch panel according to the information on the second database and link a remote control function to each of the positions of the 20 keys. When the user is using the universal remote controller, the 30 key images of the exclusive remote controller A on the first card may be viewed through the first touch panel and the 20 key images of the exclusive remote controller B on the second card may be viewed through the second touch panel. And because the processor has linked remote control functions to key positions on the first touch panel and linked remote control functions to key positions on the second touch panel, when a first touch signal is inputted to the first touch panel by the user (the first touch signal corresponds to a position of a key image on the first touch panel), the first touch signal received from the first touch panel may then be returned to the processor and the processor may execute a first remote control function according to the first touch signal. And the transmitter may transmit remote control signal corresponding to the first remote control function. When a second touch signal is inputted to the second touch panel by the user (the second touch signal corresponds to a position of a key image on the second touch panel), the second touch signal received from the second touch panel may then be returned to the processor and the processor may execute a second remote control function according to the second touch signal. And the transmitter may transmit remote control signal corresponding to the second remote control function.

In the twelfth embodiment, the connection port may be used to update the plurality of databases of the memory. If the user sets up the universal remote controller to have all the remote control functions of an exclusive remote controller, the universal remote controller of the twelfth embodiment may use the same process as described in the third embodiment, thus, would no longer be described for brevity.

For the above mentioned embodiments where the touch panel used is a display touch panel, the display touch panel may be used to display all of the key images of an exclusive remote controller. When the arrangement of the keys of the exclusive remote controller is overly complicated (i.e. the exclusive remote controller has multi-level keys or excessive number of keys), the user may be able to display all the keys of the exclusive remote controller on the display touch panel of the universal remote controller and the extended display may be viewed by performing a scrolling motion through the display touch panel. For example, for displaying an exclusive remote controller having three level keys, although the display touch panel may only display one level at a time, the user may perform a swiping motion on the touch panel to change the displayed image to a second level of keys or a third level of keys. Furthermore, although the size, the position, the key image, and the remote control function of each of the keys displayed on the display touch panel corresponds to the predetermined specification of an exclusive remote controller, the user may be able to change the size, the position, the key image, and the remote control function of each of the keys displayed on the display touch panel according to his personal preference.

For the above mentioned embodiments, the configuration of the universal remote controller may be changed. For example, the universal remote controller may have two touch panels and two slots set up to receive two cards that may be magnetic graphic cards with one card having a sensor chip as an information tag and another card having an identification code as an information tag for the universal remote controller to correspond to two exclusive remote controllers. Or, the universal remote controller may have two touch panels and one slot set up to use a reader that may be a scanning device to scan an information tag which may be an identification code or use a reader that may be a sensing device to sense an information tag which may be a sensor chip corresponding to two exclusive remote controller. And, the reader of the universal remote controller may be used to perform identification on the information tag once. Identification may be performed again when a new card with a new information tag is inserted In summary, the universal remote controller of the present invention may use a card having an information tag or a selecting signal from a portable electronic device to search for a database storing corresponding remote control functions, positions, and/or key images of an exclusive remote controller for the universal remote controller to be able to replace different exclusive remote controllers. A connection port may be used to import information to update the database inside the universal remote controller to maintain the database to its latest version. Furthermore, the universal remote controller of the present invention may comprise customization keys having functions allowing the user to change the size, the position, the key image, and the remote control function of each of the key images displayed on the touch panel. The universal remote controller of the present invention may use a card having an information tag or a selecting signal from a portable electronic device to change the exclusive remote controller corresponding to the universal remote controller. The above mention functionalities are the advantage of the universal remote controller of the present invention compared to conventional universal remote controller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A universal remote controller, comprising:
- a housing;
- a touch panel arranged on a side of the housing and configured to receive a plurality of touch signals;
- a memory disposed inside the housing and configured to store a plurality of databases;
- a processor coupled to the touch panel and the memory and configured to enable a corresponding database stored in the memory according to a driving signal to provide a plurality of remote control functions corresponding to a plurality of key images;
- a transmitter coupled to the processor and configured to transmit remote control signals corresponding to the plurality of remote control functions selected on the touch panel;
- a reader configured to read information from an information tag and output the driving signal correspondingly;
- a slot arranged inside the housing; and
- a card containing the information tag disposed in the slot;
- wherein the touch panel is a transparent touch panel, a plurality of key images are printed on a side of the card, and the plurality of key images are displayed and selected through the transparent touch panel after the card is inserted to the slot.

2. The universal remote controller of claim 1, further comprising:
- a connection port arranged on the housing;
- wherein the plurality of databases are updated through the connection port.

3. The universal remote controller of claim 2, wherein the connection port is a wired connection port or a wireless connection port.

4. The universal remote controller of claim 1, wherein the information tag is a contacting sensor chip or a non-contacting sensor chip.

5. The universal remote controller of claim 1, wherein the information tag is an identification code.

6. The universal remote controller of claim 1, wherein the card has a plurality of key images on another side and a corresponding information tag.

7. The universal remote controller of claim 1, wherein the touch panel is a display touch panel.

8. The universal remote controller of claim 7, wherein the plurality of key images are generated according to information from the information tag and are displayed and selected on the display touch panel.

9. A universal remote controller, comprising:
- a housing;
- two touch panels having one touch panel arranged on one side of the housing and another touch panel arranged on another side of the housing and configured to receive a plurality of touch signals;
- a memory disposed inside the housing and configured to store a plurality of databases;
- a processor coupled to the two touch panels and the memory and configured to enable a corresponding database stored in the memory according to a driving signal to provide a plurality of remote control functions corresponding to a plurality of key images; and a transmitter coupled to the processor and configured to transmit remote control signals corresponding to the plurality of remote control functions selected on the touch panel;

two readers, each configured to read information from an information tag and output the driving signal correspondingly;

two slots arranged inside the housing;

a first card containing a first information tag disposed in a first slot of the two slots; and a second card containing a second information tag disposed in the second slot of the two slots;

wherein the two touch panels are transparent touch panels, and a group of the plurality of key images are printed on a first card and are displayed and selected through a first touch panel of the two touch panels after the first card is inserted into the first slot, and another group of the plurality of key images are printed on a second card and are displayed and selected through a second touch panel of the two touch panels after the second card is inserted into the second slot.

10. The universal remote controller of claim 8, further comprising:

a connection port arranged on the housing;

wherein the plurality of databases are updated through the connection port.

11. The universal remote controller of claim 10, wherein the connection port is a wired connection port or a wireless connection port.

12. The universal remote controller of claim 9, wherein the information tag is a contacting sensor chip or a non-contacting sensor chip.

13. The universal remote controller of claim 9, wherein the information tag is an identification code.

14. The universal remote controller of claim 9, wherein the two touch panels are display touch panels.

15. The universal remote controller of claim 14, wherein a group of the plurality of key images are generated according to information from an information tag of a first card and are displayed and selected through a first touch panel of the two touch panels, and another group of the plurality of key images are generated according to information from an information tag of a second card and are displayed and selected through a second touch panel of the two touch panels.

* * * * *